(12) United States Patent
Uchikubo et al.

(10) Patent No.: US 6,480,762 B1
(45) Date of Patent: Nov. 12, 2002

(54) MEDICAL APPARATUS SUPPORTING SYSTEM

(75) Inventors: Akinobu Uchikubo, Oume (JP); Takao Tabata, Machida (JP); Junichi Onishi, Hachioji (JP); Satoshi Honma, Hino (JP); Takashi Ozaki, Hachioji (JP); Makoto Tsunakawa, Toda (JP); Kazunori Taniguchi, Hachioji (JP); Takeaki Nakamura, Hino (JP); Yoshia Hoshino, Hachioji (JP); Masakazu Gotanda, Kanagawa (JP); Norihiko Hareyama, Hachioji (JP)

(73) Assignee: Olympus Optical Co., Ltd. (JP)

( * ) Notice: Subject to any disclaimer, the term of this patent is extended or adjusted under 35 U.S.C. 154(b) by 217 days.

(21) Appl. No.: 09/670,167

(22) Filed: Sep. 26, 2000

(30) Foreign Application Priority Data

| Sep. 27, 1999 | (JP) | .......................................... 11-272792 |
| Oct. 1, 1999 | (JP) | .......................................... 11-282004 |
| Oct. 26, 1999 | (JP) | .......................................... 11-304281 |
| Sep. 5, 2000 | (JP) | ........................................ 2000-269180 |

(51) Int. Cl.$^7$ ............................................. G05B 19/04
(52) U.S. Cl. ..................... 700/253; 700/245; 700/250; 600/200; 600/301; 600/483; 606/1; 606/130; 606/148; 128/904; 128/905; 128/897; 128/898; 340/537.1; 340/286.01; 340/825.36
(58) Field of Search ............................... 700/250, 253, 700/90; 606/1, 130, 148; 600/300, 301, 483; 128/904, 905, 897, 898; 340/573.1, 286.01, 825.36

(56) References Cited

U.S. PATENT DOCUMENTS

| 5,441,047 A | * | 8/1995 | David et al. ................. 128/904 |
| 5,544,649 A | * | 8/1996 | David et al. ................. 128/904 |
| 5,549,616 A | * | 8/1996 | Schulte et al. ................. 5/622 |
| 5,797,924 A | * | 8/1998 | Schulte et al. ................. 606/1 |
| 5,913,310 A | * | 6/1999 | Brown ........................ 128/897 |
| 5,918,603 A | * | 7/1999 | Brown ........................ 128/897 |
| 5,963,136 A | * | 10/1999 | O'Brien .................... 340/573.1 |
| 6,150,942 A | * | 11/2000 | O'Brien .................... 340/573.1 |

FOREIGN PATENT DOCUMENTS

| JP | 7-132121 | 5/1995 |
| JP | 8-179986 | 7/1996 |

* cited by examiner

Primary Examiner—William A. Cuchlinski, Jr.
Assistant Examiner—Marc McDieunel
(74) Attorney, Agent, or Firm—Ostrolenk, Faber, Gerb & Soffen, LLP

(57) ABSTRACT

A plurality of pieces of medical equipment each of which includes a microcomputer and has a program used to control the microcomputer stored in a reproqrammable storage device such as an EEPROM is linked to a remote computer over a communication line. Using a rewriting/updating program sent from the computer, each piece of medical equipment rewrites or updates the program stored in the storage device. When a plurality of programs is stored, if one of the programs is rewritten or updated abnormally, the other program is used to activate medical equipment.

40 Claims, 31 Drawing Sheets

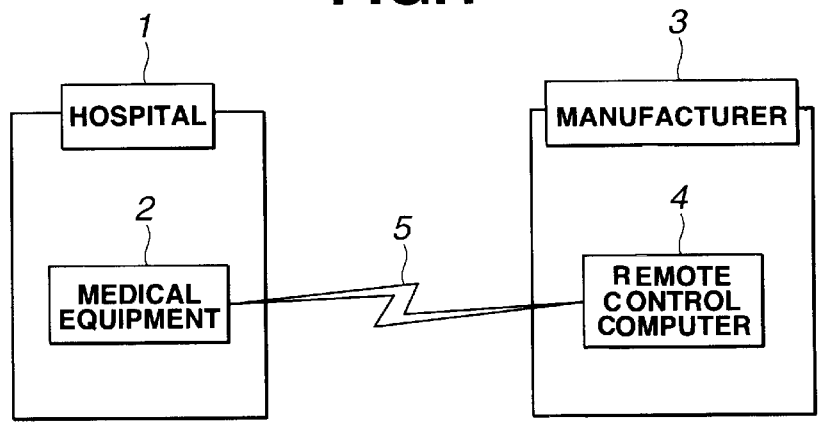
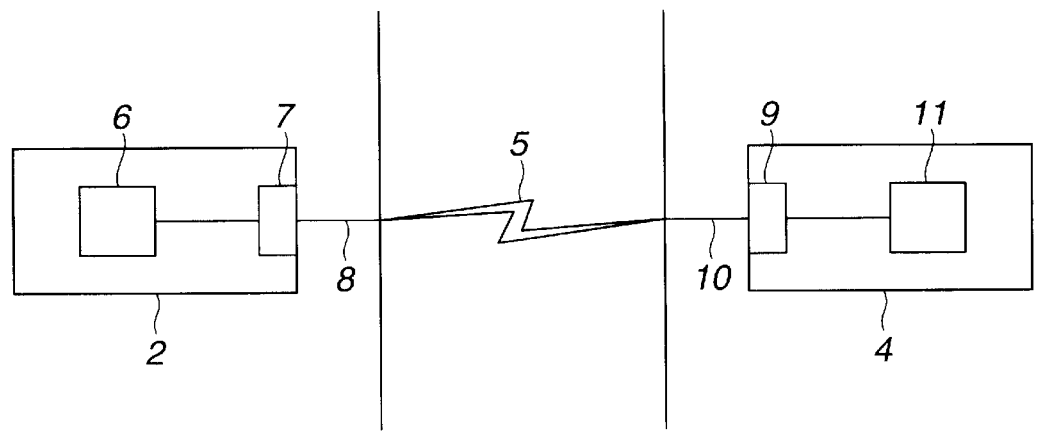
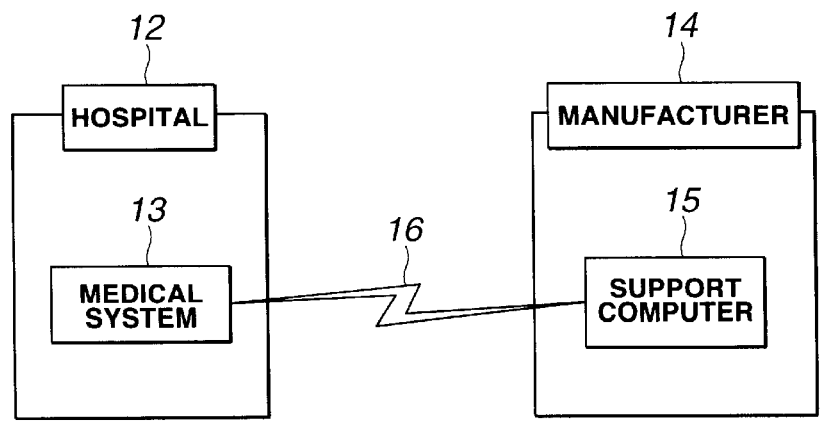

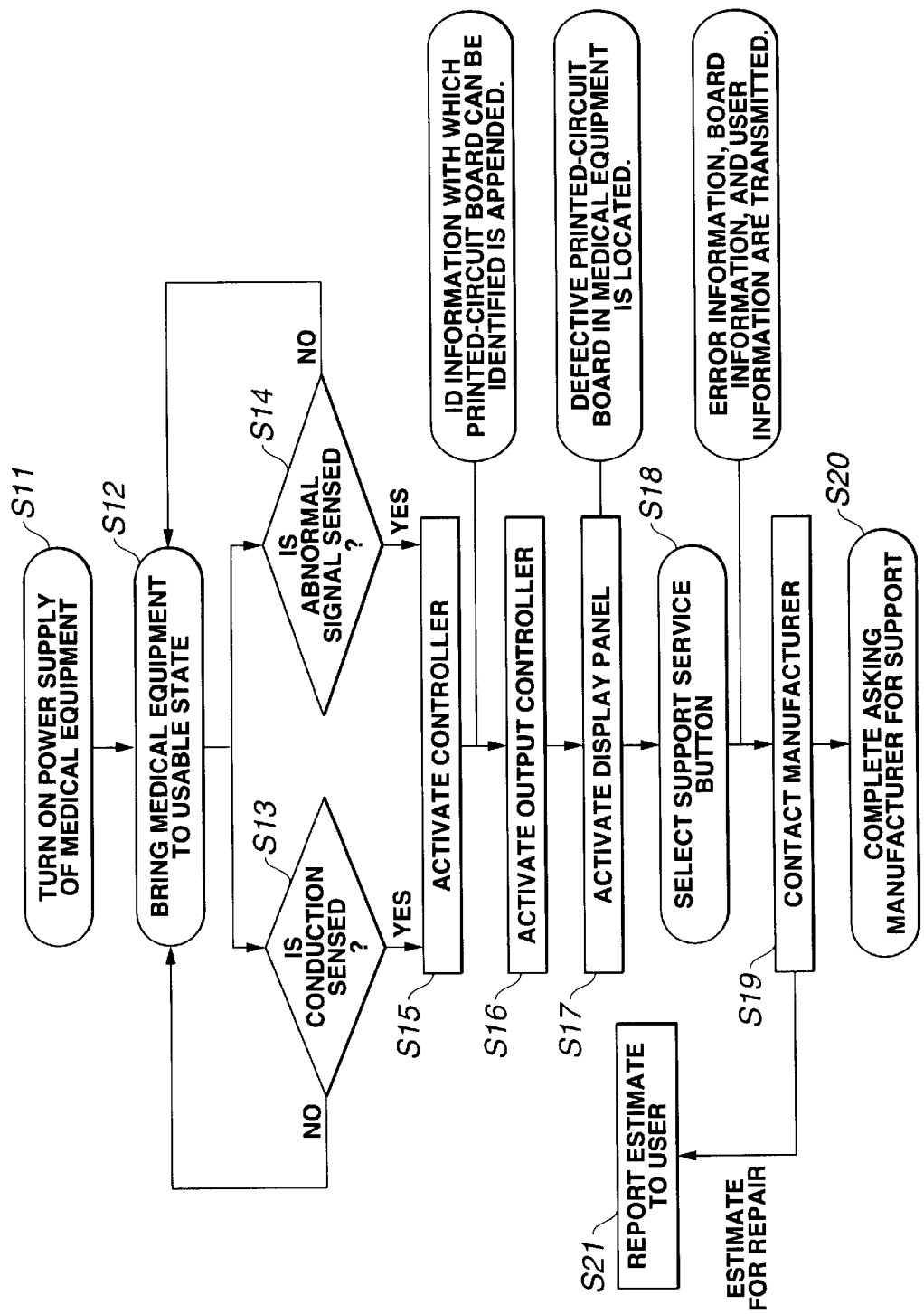

FIG.10
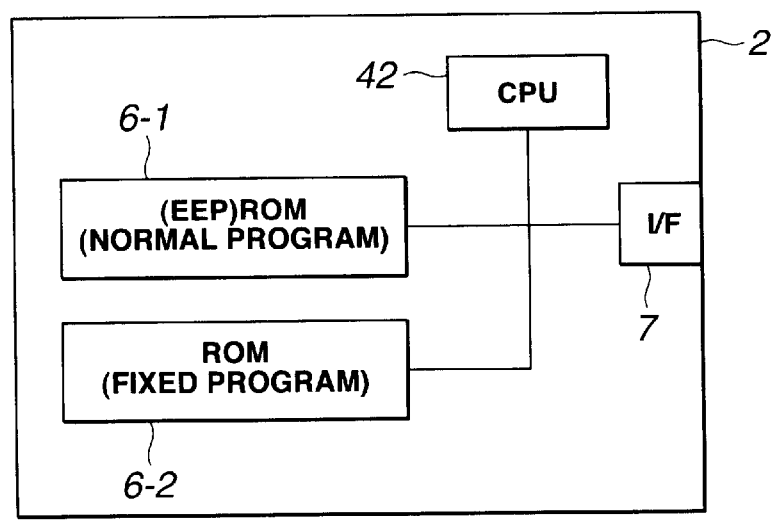
FIG.11A
NORMALLY-ACTIVE FACILITIES
MEDICAL EQUIPMENT MONITORING — 46a
CENTRALIZED MEDICAL EQUIPMENT DISPLAY — 46b
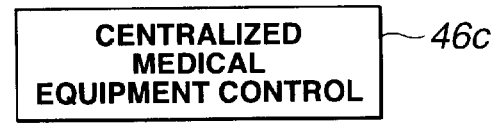
CENTRALIZED MEDICAL EQUIPMENT CONTROL — 46c
COMPREHENSIVE MEDICAL EQUIPMENT SETTING — 46d
FIG.11B
MINIMUM NECESSARY FACILITIES
MEDICAL EQUIPMENT MONITORING — 46a
CENTRALIZED MEDICAL EQUIPMENT CONTROL — 46c

FIG.32

APPARATUS ID NUMBER [ 10. 02. 01 ]

CLASSIFICATIONS OF APPARATUSES
- SYSTEM UNIT ---- 00
- ENDOSCOPE CAMERA UNIT ---- 01
- LIGHT SOURCE UNIT ---- 02
- IMAGE PROCESSING UNIT ---- 03
- ELECTRIC CAUTERY ---- 04
- ULTRASONIC TREATMENT APPLIANCE ---- 05
- PNEUMOPERITONEUM UNIT ---- 06
- ULTRASONIC OBSERVATION DEVICE ---- 07
- VTR ---- 08
- VIDEO PRINTER ---- 09
- PHOTOGRAPHY UNIT ---- 10
- IMAGE RECORDING UNIT ---- 11
- OBSERVATION MONITOR ---- 12
- CENTRALIZED OPERATOR PANEL ---- 13
- REMOTE CONTROL UNIT ---- 14

AND SO ON

MODELS OF CLASSIFIED APPARATUSES

SYSTEM UNIT
- SYSTEM CONTROLLER ---- 00
- REPEATER UNIT ---- 01

ENDOSCOPE CAMERA UNIT
- ONE-CCD CAMERA 1 ---- 00
- THREE-CCD CAMERA 1 ---- 01
- ONE-CCD CAMERA 2 ---- 02
- THREE-CCD CAMERA 2 ---- 03
- ONE-CCD CAMERA 3 ---- 04
- THREE-CCD CAMERA 3 ---- 05

LIGHT SOURCE UNIT
- XENON LIGHT SOURCE 1 ---- 00
- HALOGEN LIGHT SOURCE 1 ---- 01
- XENON LIGHT SOURCE 2 ---- 02
- HALOGEN LIGHT SOURCE 2 ---- 03

AND SO ON

OPTION INFORMATION :
APPARATUS TO BE USED WHEN ONE SYSTEM INCLUDE MANY APPARATUSES OF THE SAME MODEL
- DEFAULT ---- 01
  (APPARATUS WHOSE CONNECTION IS CONFIRMED FIRST)
- APPARATUS WHOSE CONNECTION IS CONFIRMED SECONDLY ---- 02
- APPARATUS WHOSE CONNECTION IS CONFIRMED THIRDLY ---- 03

AND SO ON

MEDICAL APPARATUS SUPPORTING SYSTEM

The present application refers to Japanese Patent Application No. 11-272792 filed on Sep. 27, 1999, Japanese Patent Application No. 11-282004 filed on Oct. 1, 1999, Japanese Patent Application No. 11-304281 filed on Oct. 26, 1999, and Japanese Patent Application No. 2000-269180 filed on Sep. 5, 2000, which are the basics of the present application, and benefits from the basic patent applications.

BACKGROUND OF THE INVENTION

Field of the Invention and Description of the Related Art

The present invention relates to a medical apparatus supporting system for providing a maintenance service for medical equipment.

In recent years, microcomputers have been used to drive and control medical equipment. When a program installed in the microcomputer and described how to drive and control medical equipment contains a bug or when the program must be updated through modification or extension, a maintenance serviceperson visits a site in which the medical equipment is installed. The serviceperson dismounts a printed-circuit board realizing the microcomputer having the program installed therein, and brings it with her/his back to a predetermined maintenance service center. Otherwise, the serviceperson updates the program using a reprogramming apparatus at the site in which the printed-circuit board is dismounted.

However, it is time-consuming and skilled labor to dismount a printed-circuit board concerned from medical equipment or a ROM included in a microcomputer and used to store a program. Under the circumstances, Japanese Unexamined Patent Application Publication No. 8-179986 has proposed a method of writing a new program, or rewriting or updating the program without the necessity of dismounting the microcomputer or ROM.

Moreover, Japanese Unexamined Patent Application Publication No. 7-132121 has proposed a method of displaying information on a centralized display panel to report the information to a surgeon or an operator of medical equipment. Specifically, according to the method, when a plurality of pieces of medical equipment is used to extend medical conducts, information indicating that each piece of medical equipment has been driven under preset conditions is displayed on the concentrated display panel. Moreover, assume that certain medical equipment has been driven to enter a state different from a preset driven state, or more particularly, medical equipment fails or acts under conditions different from preset conditions. In this case, an error indication meaning that an abnormality has occurred in the medical equipment is displayed in an area on the display panel allocated to the medical equipment. Thus, the state of medical equipment is reported to a surgeon or an operator of medical equipment.

The Japanese Unexamined Patent Application Publication No. 8-179986 has proposed a method of writing, rewriting, or updating a program stored in a ROM included in a microcomputer even after the microcomputer or ROM is mounted on a printed-circuit board included in medical equipment or any other electronic equipment. However, for writing, rewriting, or updating the program stored in the ROM included in the microcomputer, a maintenance serviceperson has to visit the installation site of the medical equipment. The owner of the medical equipment cannot use the medical equipment until the serviceperson completes writing, rewriting, or updating the program. It takes too much time until the medical equipment becomes reusable.

Moreover, according to the Japanese Unexamined Patent Application Publication No. 7-132121, if certain medical equipment included in a surgical system composed of a plurality of pieces of medical equipment malfunctions, an error indication is displayed on the display area on the display panel allocated to the medical equipment. Thus, it is reported to a surgeon or an operator of medical equipment that the medical equipment has malfunctioned. However, although the malfunctioning medical equipment may be specified, it is impossible to discover the contents of the malfunction and locate a defective component of the medical equipment causing the malfunction. For this reason, a maintenance serviceperson must visit the installation site of the medical equipment to locate the defective component thereof causing the malfunction and repair the defective component. The user of the medical equipment cannot therefore use the medical equipment for a long period of time from the occurrence of the malfunction to the resolution thereof.

OBJECT AND SUMMARY OF THE INVENTION

An object of the present invention is to provide a medical apparatus supporting system making it possible to rewrite or update a program stored in a storage device such as a ROM, in which a program for instructing a microcomputer included in medical equipment how to operate is stored, by extending remote control over a communication line.

Another object of the present invention is to provide a medical apparatus supporting system for, when medical equipment malfunctions, reporting malfunction information to a user of the medical equipment by displaying the malfunction information, and transmitting the malfunction information to a maintenance service provider over a communication line so that a maintenance service can be provided immediately.

A medical apparatus supporting system consists mainly of a plurality of pieces of medical equipment, a reprogrammable storage device, a reprogramming control unit, and a computer. The plurality of pieces of medical equipment has a communication facility. The reprogrammable storage device is included in each of the plurality of pieces of medical equipment. A program used to drive and control each piece of medical equipment is stored in the storage device. The reprogramming control unit reprograms the storage device. The computer has a communication facility for communicating data over an information communication line, and transmits a rewriting/updating program with which a program stored in the storage device is rewritten or updated.

The rewriting/updating program with which the program stored in the storage device included in each piece of medical equipment is rewritten or updated is transmitted to each piece of medical equipment over the information transmission line under control of the computer. The reprogramming control unit rewrites or updates the program stored in the storage device using the received rewriting/updating program. Thus, the program can be rewritten or updated remotely using the computer located away from the pieces of medical equipment.

BRIEF DESCRIPTION OF THE DRAWINGS

FIG. 1 to FIG. 3 are concerned with the first embodiment of the present invention;

FIG. 1 is a block diagram showing the overall configuration of the first embodiment of the present invention;

FIG. 2 is a block diagram showing a practical configuration of the first embodiment;

FIG. 3 is a flowchart describing actions to be performed in the first embodiment;

FIG. 4 to FIG. 7 are concerned with the second embodiment of the present invention;

FIG. 4 is a block diagram showing an overall configuration of a medical apparatus supporting system in accordance with the second embodiment;

FIG. 5 is a block diagram showing in detail the second embodiment;

FIG. 6 is a block diagram showing a configuration of a local assessment means included in medical equipment employed in the second embodiment;

FIG. 7 is a flowchart describing actions to be performed in the second embodiment;

FIG. 8A to FIG. 9 are concerned with the third embodiment of the present invention;

FIG. 8A is a block diagram showing a configuration of a medical apparatus supporting system in accordance with the third embodiment;

FIG. 9 is a flowchart describing actions to be performed in the third embodiment;

FIG. 10 to FIG. 12 are concerned with the fourth embodiment of the present invention;

FIG. 10 is a block diagram showing an example of a configuration of medical equipment employed in the fourth embodiment;

FIG. 11A and FIG. 11B describe facilities to be invoked for normal actions and facilities to be invoked for necessary minimum actions;

FIG. 12 is a flowchart describing actions to be performed in the fourth embodiment;

FIG. 13 shows a medical apparatus supporting system in accordance with the fifth embodiment;

FIG. 14 is a block diagram showing a practical configuration of the fifth embodiment;

FIG. 15 is a flowchart describing actions to be performed in the fifth embodiment;

FIG. 32 shows the meanings of an apparatus ID number whose assignment is described in conjunction with FIG. 30 and FIG. 31;

DESCRIPTION OF THE PREFERRED EMBODIMENTS

Figure 3:
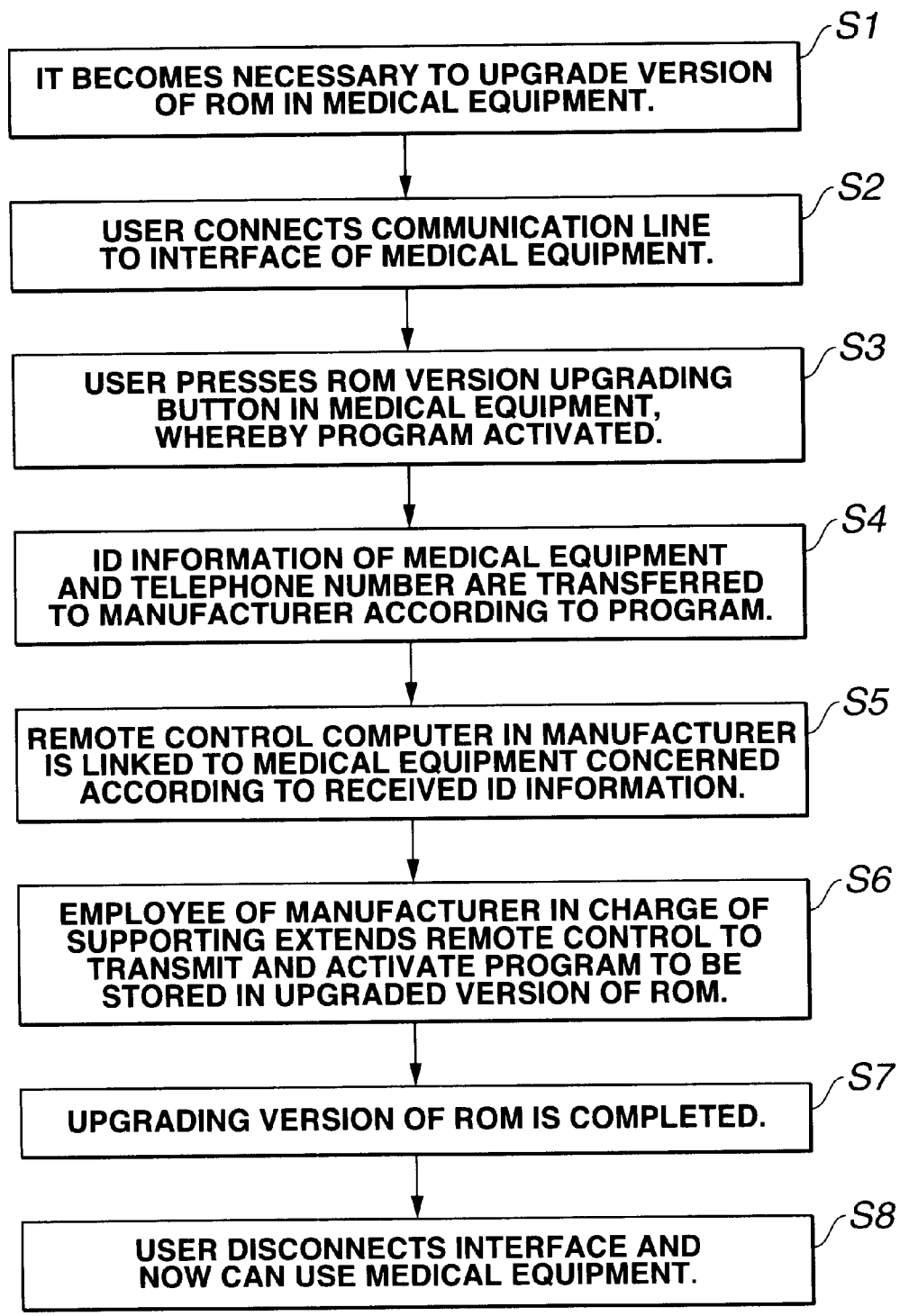

Referring to FIG. 1 to FIG. 3, the first embodiment of the present invention will be described below.

As shown in FIG. 1, a medical apparatus supporting system in accordance with the present embodiment includes a hospital 1 or any other medical institution in which medical equipment 2 that is a surgical system using an electronic endoscope is installed. The medical equipment 2 is composed of an electronic endoscope, an endoscope light source unit, a lesion display monitor for a surgeon, an image processing unit, a recording unit, a pneumoperitoneum unit, and a treatment appliance. On the other hand, a remote control computer 4 is installed in a manufacturer 3 for manufacturing and/or selling the medical equipment 2 to be installed in the hospital 1, or providing a maintenance service for the medical equipment. The medical equipment 2 in the hospital 1 is linked to the remote control computer 4 in the manufacturer 3 over a communication line 5. The communication line 5 may be realized with wire communication, for example, a public telephone line or a leased telephone line, or radiocommunication using radio waves.

As shown in FIG. 2, the medical equipment 2 includes a ROM 6 in which a program for instructing a microcomputer included in the medical equipment 2 to control driving actions performed in the medical equipment 2 is stored. A communication cable 8 is connected to the ROM 6 via an interface 7 for interfacing the ROM with the communication line 5. The ROM 6 is realized with an electrically reprogrammable nonvolatile memory, for example, an electrically erasable programmable ROM (EEPROM) or a flash memory.

On the other hand, the remote control computer 4 installed in the manufacturer 3 includes a program storage means (a hard disk in practice) 11 in which a rewriting/updating execution program and a new rewriting/updating program are stored. A communication cable 10 is connected to the program storage means 11 via an interface 9 for interfacing the program storage means 11 with the communication line 5.

Rewriting or updating of a program stored in the ROM 6 in the medical equipment 2 with the medical equipment 2 and remote control computer 4 linked will be described in conjunction with FIG. 3.

Assuming that it becomes necessary to rewrite or update the program stored in the ROM 6 included in the medical equipment 2 installed in the hospital 1, the manufacturer 3 contacts the hospital 1 to report the necessity of rewriting or updating the program (step S1). In response to the report of the necessity of rewriting or updating the program sent from the manufacturer 3, the hospital 1 connects the communication cable 8 of the medical equipment 2 to the predetermined communication line 5 (step S2).

Thereafter, in the hospital 1, a ROM Version Upgrading button or switch (hereinafter a version upgrading button), which is not shown, included in the medical equipment 2 is pressed. A rewriting/updating execution program that is not shown is read from the ROM 6 in the medical equipment 2, and then run (step S3). The rewriting/updating execution program stored in the ROM 6 in the medical equipment 2 is run at step S3, whereby identification (hereinafter ID) information with which the medical equipment 2 is identified and a telephone number are transmitted (step S4).

The manufacturer 3 collates the ID information and telephone number, which are sent from the hospital 1 at step S4, with a customer/installed medical equipment list, which is not shown, stored in the remote control computer 4. If the ID information and telephone number are consistent with those written in the list the remote control computer 4 in the manufacturer 3 is connected to the communication line 5 (step S5). After the medical equipment 2 in the hospital 1 is linked to the remote control computer 4 in the manufacturer at step S5, the manufacturer 3 transmits a new rewriting/updating program, with which an old program is rewritten or updated, over the communication line 5 according to the rewriting/updating execution program installed in the remote control computer 4 (step S6).

According to the rewriting/updating execution program transmitted from the manufacturer 3, the new rewriting/updating program is used to rewrite or update an old program stored in the ROM 6 included in the medical equipment 2 in the hospital 1 (step S7). When the new rewriting/updating program has been stored, the interfaces 7 and 9 in the hospital 1 and manufacturer 3 respectively disconnected from the communication line 5. Hereinafter, the hospital 1 can drive and control the medical equipment 2 according to the new rewriting/updating program stored the ROM 6.

Conventionally, a maintenance serviceperson visits the hospital 1, dismounts a ROM from medical equipment, brings it back with him/her, and stores a new rewriting/updating program in the ROM. Otherwise, the rewriting/updating program is stored in order to rewrite an old program at the installation side of the medical equipment. In contrast, according to the present embodiment, a new rewriting/updating program with which an old program is rewritten or updated can be transmitted from a remote control computer installed in a manufacturer to medical equipment installed in a hospital in order to rewrite an old program. Consequently, a program can be rewritten immediately by utilizing a time zone during which the medical equipment is unused in the hospital.

Iteratively, when a processing program must be rewritten or updated, the program stored in a ROM in medical equipment can be rewritten or updated over a communication line linking a manufacturer and a medical institution at which the medical equipment is installed. Even if the medical institution is located remotely away from the manufacturer, the program stored in the ROM in the medical equipment can be efficiently rewritten or updated with the medical equipment kept installed in the medical institution during a time zone convenient to the medical institution. This contributes to improvement of processing efficiency.

Next, the second embodiment of the present invention will be described with reference to FIG. 4 to FIG. 7.

As shown in FIG. 4, according to the second embodiment, a medical system 13 installed in a hospital 12 and a support computer 15 installed in a manufacturer 14 for manufacturing and/or selling the medical system 13 or providing a maintenance service are linked over a communication line 16. This results in a medical apparatus supporting system.

Figure 5:
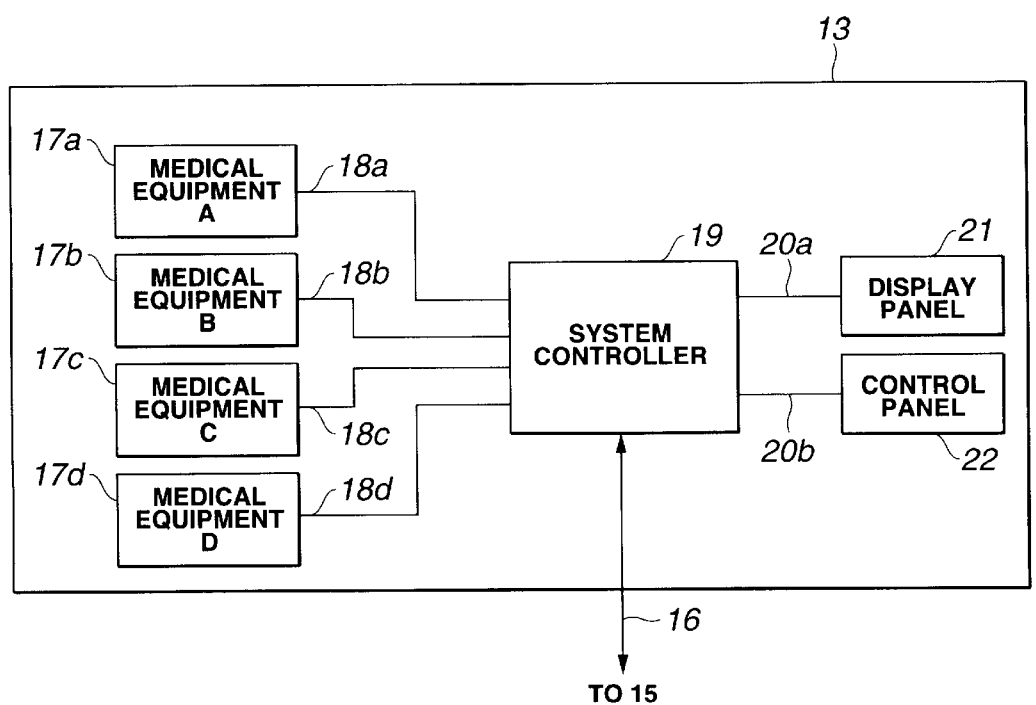

The medical system 13 installed in the hospital 12 has, as shown in FIG. 5, a plurality of pieces of medical equipment 17a, 17b, 17c, and 17d having mutually different abilities is connected to a system controller 19 over communication cables 18a, 18b, 18c, and 18d. A centralized display panel 21 that is a display means is connected to the system controller 19 over a communication cable 20a, and a centralized control panel 22 that is a display input means including a display means is connected thereto over a communication cable 20b.

When the centralized control panel 22 is used to enter a driving instruction to be input to the pieces of medical equipment 17a to 17d, the system controller 19 sorts instructions entered at the centralized control panel 22. The system controller 19 then transmits them to the respective pieces of medical equipment 17a to 17d over the communication cables 18a to 18d. The pieces of medical equipment 17a to 17d are driven under control of microcomputers included in the pieces of medical equipment 17a to 17d. The driven states of the pieces of medical equipment 17a to 17d are transmitted to the system controller 19 over the communication cables 18a to 18d, and displayed on the display panel 21 in association with the pieces of medical equipment 17a to 17d.

The pieces of medical equipment 17a to 17d that are surgical systems based on an electronic endoscope are each composed of, for example, an electronic endoscope, an endoscope light source unit, a lesion display monitor for a surgeon, an image processing unit, a recording unit, a pneumoperitoneum unit, and a treatment appliance. The pieces of medical equipment 17a to 17d each includes built-in printed-circuit boards that realize a facility for driving and controlling medical equipment. The printed-circuit boards also realize a local assessment facility for monitoring a driven and controlled state and locally assesses it to judge whether the driven and controlled state falls within a predetermined range or falls outside the predetermined range to correspond to an abnormal or incorrect state.

Figure 6:
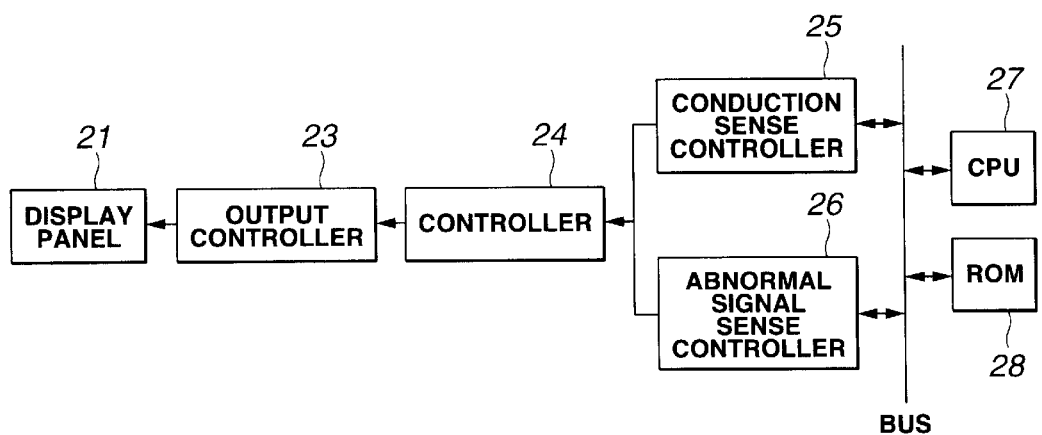

The local assessment facility is realized with each built-in printed-circuit board included in each of the pieces of medical equipment 17a to 17d. For example, the medical equipment 17a includes, as shown in FIG. 6, a microcomputer (hereinafter CPU) 27 and a ROM 28. The CPU 27 drives and controls printed-circuit boards which are included in the medical equipment 17a and on which a driving control circuit or the like is mounted. A processing program for instructing the CPU 27 how to act is stored in the ROM 28. The program and various control instructions are transferred between the CPU 27 and ROM 28 over a bus. The CPU 27 and ROM 28 are connected to a conduction sense controller 25 and an abnormal signal sense controller 26 over the bus.

When the power supply of the medical equipment 17a is turned on, the conduction sense controller 25 monitors a driving signal applied by a driving control circuit mounted on any of the printed-circuit boards driven and controlled by the CPU 27 according to the programs stored in the ROM 28. The conduction sense controller 25 checks if the driving signal assumes a predetermined voltage level. If the driving signal applied by the driving control circuit is lower or higher than the predetermined voltage level, an error signal is produced. The abnormal signal sense controller 26 monitors a processing signal produced by each driving control circuit according to the program read from the ROM 28 while the CPU 27 is controlling the driving control circuit. The abnormal signal sense controller 26 checks if the produced processing signal is a predetermined processing signal. If the produced processing signal is not the predetermined one, an error signal is produced.

If the conduction sense controller 25 or abnormal signal sense controller 26 senses an abnormal driving signal produced by a driving control circuit mounted in any printed-circuit board included in the medical equipment 17a or an abnormal processing signal, an error signal is fed to a controller 24. The controller 24 produces a display signal according to the contents of an abnormality represented by the fed error signal and an identification (hereinafter ID) number assigned to a printed-circuit board on which the abnormality has occurred, and outputs the display signal to an output controller 23. The output controller 23 drives and controls the centralized display panel 21 according to the display signal fed from the controller 24, and identifies and displays the ID number of the printed-circuit board on which the abnormality has occurred and the abnormality.

An error information detection facility realized with the conduction sense controller 25 and abnormal signal sense controller 26 is included in each of the pieces of medical equipment 17a to 17d. Specifically, an instruction is entered at the centralized control panel 22, and the system controller 19 controls driving of the pieces of medical equipment 17a to 17d according to the entered instruction. Information of the driven states of the pieces of medical equipment 17a to 17d is output to the centralized display panel 21 via the system controller 19 and displayed in association with the pieces of medical equipment 17a to 17d.

Assume that an abnormality occurs in any of the pieces of medical equipment 17a to 17d, for example, assume that the voltage level of a driving signal fed from a drive circuit mounted on any of the printed-circuit boards included in the medical equipment 17a is abnormal. In this case, the conduction sense controller 25 included in the medical equipment 17a senses the abnormality. A voltage level error signal is then output to the controller 24 included in the medical equipment 17a. The controller 24 in the medical equipment 17a produces an error indication signal representing a voltage level error indication and the ID information of the printed-circuit board on which the abnormal voltage level has occurred, and outputs the error indication signal to the output controller 23. The output controller 23 controls the centralized display panel 21 to display the contents of the abnormality and the ID information of the abnormal printed-circuit board according to the error indication signal.

For example, assume that a processing signal output from a drive circuit mounted on any of the printed-circuit boards included in the medical equipment 17c is abnormal. If the abnormal signal sense controller 26 included in the medical equipment 17c senses the abnormality, it produces a processing signal error signal. The processing signal error signal is output to the controller 24 in the medical equipment 17c. Based on the signal processing error signal, the controller 24 in the medical equipment 17c produces an error indication signal representing a signal processing error indication and the ID information of the printed-circuit board on which abnormal signal processing has occurred. The error indication signal is output to the output controller 23. The output controller 23 controls the centralized display panel 21 to display the contents of the abnormality and the ID information of the abnormal printed-circuit board according to the error indication signal.

Consequently, the operators of the pieces of medical equipment 17a to 17d can always monitor the driven states of the medical equipment at the sight of the indications displayed on the centralized display panel 21. If the driven state of any medical equipment is abnormal, not only the abnormal medical equipment can be specified but also an abnormal printed-circuit board in the medical equipment can be identified. The information of the abnormality is transmitted to the manufacturer 14 over the communication line 16, whereby a request for a maintenance service can be immediately issued to the manufacturer 14. Moreover, the manufacturer 14 can immediately locate an abnormal device mounted on the printed-circuit board and make preparations for repair of the abnormal device.

Next, actions to be performed from the instant abnormal medical equipment is found to the instant a request for a maintenance service is issued to the manufacturer 14 will be described in conjunction with FIG. 7.

The medical system 13 is installed in a predetermined therapeutic place within the hospital 12. The power supply of medical equipment is turned on (step S11). A driving control instruction for instructing driving and control of the pieces of medical equipment 17a to 17d is entered at the centralized control panel 22. The pieces of medical equipment 17a to 17d are driven in response to the instruction. The driven states of the medical equipment are displayed on the centralized display panel 21, whereby the pieces of medical equipment used to perform treatment are thought to have entered the usable states (step S12). When the pieces of medical equipment have entered the usable states at step S12, the conduction sense controller 25 executes conduction sensing (step S13). Specifically, the conduction sense controller 25 senses an abnormal driving signal fed from a drive circuit mounted on any of the built-in printed-circuit boards included in the pieces of medical equipment 17a to 17d. Moreover, the abnormal signal sense controller 26 executes abnormal signal sensing (step S14) to sense an abnormal processing signal output from a drive circuit mounted on any of the built-in printed-circuit boards included in the pieces of medical equipment 17a to 17d.

If an abnormality is sensed at either of step S13 and step S14, the controller 24 judges whether the contents of the abnormality are abnormal conduction or an abnormal signal. The controller 24 then produces error indication information representing the contents of the abnormality and the ID information of the abnormal printed-circuit board (step S16). The error indication information is converted into an error indication signal by the output controller 23 (step S16), and fed to the centralized display panel 21. Consequently, the abnormal one of the pieces of medical equipment 17a to 17d, the contents of the abnormality, and the ID information of the abnormal printed-circuit board are indicated using the centralized display panel 21 (step S17).

While referencing the error indication displayed on the centralized display panel 21, a surgeon or an operator of medical equipment selects and presses a Support Service button, which is not shown, formed on the centralized control panel 22 (step S18). The medical system 13 is then linked to the support computer 15 installed in the manufacturer 14 over the communication line 16, and transmits ID information representing the hospital name, medical equipment, and printed-circuit board in which the abnormality has occurred, and the contents of the abnormality In response to the abnormality information sent from the hospital 12, the manufacturer 14 returns a reply, which indicates that the abnormality information has been received and a request for support has been granted, to the hospital 12. Thus, the hospital 12 has completed requesting the manufacturer to give support (step S20). The manufacturer 14 procures various parts required for providing a repair service to resolve the abnormality, assigns a serviceperson to the repair service job, estimates the time required for the repair service, and reports the estimate to the hospital 12 (step S21).

As mentioned above, according to the second embodiment, the driven and controlled state of a component of medical equipment, which is driven by a driving control circuit mounted on each printed-circuit board included in each piece of medical equipment included in a medical system, is sensed, and indicated using a display panel. A surgeon or an operator can therefore grasp the driven state of medical equipment during use of the medical equipment, and continue treatment at ease.

If medical equipment should become abnormal, the abnormal medical equipment and the contents of the abnormality are indicated using the display panel. Once the abnormal medical equipment alone is replaced with a new one, treatment can be continued. As for the abnormal medical equipment, occurrence of an abnormality can be reported immediately to a manufacturer over a communication line, and a request for a repair service can be issued immediately to the manufacturer. The ID information representing the abnormal medical equipment, the contents of the abnormality, and an abnormal printed-circuit board is transmitted to the manufacturer together with the request for a repair service. Therefore, the manufacturer can predict a cause of the abnormality, procure parts necessary for the repair service, and estimate the time required for the repair service. Consequently, the repair service can be provided immediately.

Each printed-circuit board for realizing a facility included in medical equipment is designed to also realize a local assessment facility. The medical equipment is linked to a medical equipment repair service provider over a communication line. Thus, if the medical equipment should become abnormal, the contents of the abnormality are indicated using a display panel. The abnormal action of the medical equipment can be coped with immediately. Beside, the abnormality information is transmitted to the repair service provider over the communication line. Consequently, the cause of the abnormality can be predicted, and a repair service can be provided immediately.

Next, the third embodiment of the present invention will be described with reference to FIG. 8A to FIG. 9.

The configuration of a medical apparatus supporting system in accordance with the present embodiment is the same as that shown in FIG. 1. Moreover, the configuration shown in FIG. 8A corresponds to the configuration of the medical apparatus supporting system shown in FIG. 2.

Figure 8A:
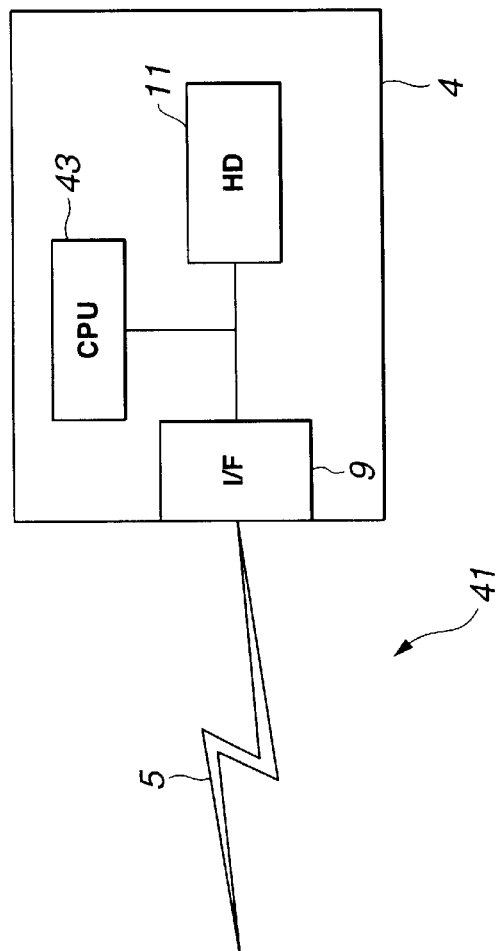

A medical apparatus supporting system 41 shown in FIG. 8A consists mainly of medical equipment 2 having a communication facility and a remote control computer 4 linked to the medical equipment 2 over a communication line 5 over which information is transmitted.

The medical apparatus supporting system 41 includes a plurality of program storage means in which a program for instructing the medical equipment 2 how to act is stored, or more particularly, two ROMs 6-1 and 6-2 as shown in FIG. 8A.

The medical equipment 2 includes a CPU 42 connected to a communication interface 7 and the two ROMs 6-1 and 6-2. The CPU 42 controls the actions of the medical equipment 2 according to the program stored in the ROM 6-1 or ROM 6-2. The programs stored in the ROM 6-1 and ROM 6-2 are rewritten under control of the CPU 42. The ROM 6-1 and ROM 6-2 are realized with, for example, nonvolatile electrically reprogrammable EEPROMs (or flash memories).

The remote control computer 4 includes an interface 9 connected to the communication line 5 and a CPU 43 connected to a program storage means (hard disk) 11 in which a rewriting program is stored. The CPU 43 controls transmission of the program used to rewrite an old program. An operation program for instructing the CPU 43 how to act is also stored in the hard disk 11.

According to the present embodiment, at least two memory means are included as memory means in which a program to be transmitted is stored. Even if transmission of data over the communication line 5 is not performed smoothly a program can be rewritten reliably.

According to the first embodiment, a rewriting/updating program with which an old program is rewritten or updated is transmitted from the remote control computer 4 to the medical equipment 2 in the hospital 1 over the communication line 5. Thus, a program stored in the ROM 6 is rewritten or updated. However, the quality of transmitted data may be deteriorated in some states of the communication line 5.

According to the present embodiment, the plurality of ROMS, that is, the ROM 6-1 and ROM 6-2 are, as mentioned above, employed so that a program can be rewritten or updated more reliably.

To be more specific, data stored in one of the plurality of ROMs, that is, one of the ROM 6-1 and ROM 6-2 is rewritten based on whether received data (rewriting program) is odd-numbered or even-numbered data. If an old program is not rewritten normally with the first program (for example, at an odd-numbered program), the program stored in the other one of the ROM 6-1 and ROM 6-2 is rewritten using a program received next (for example, at an even-numbered program).

Figure 8B:
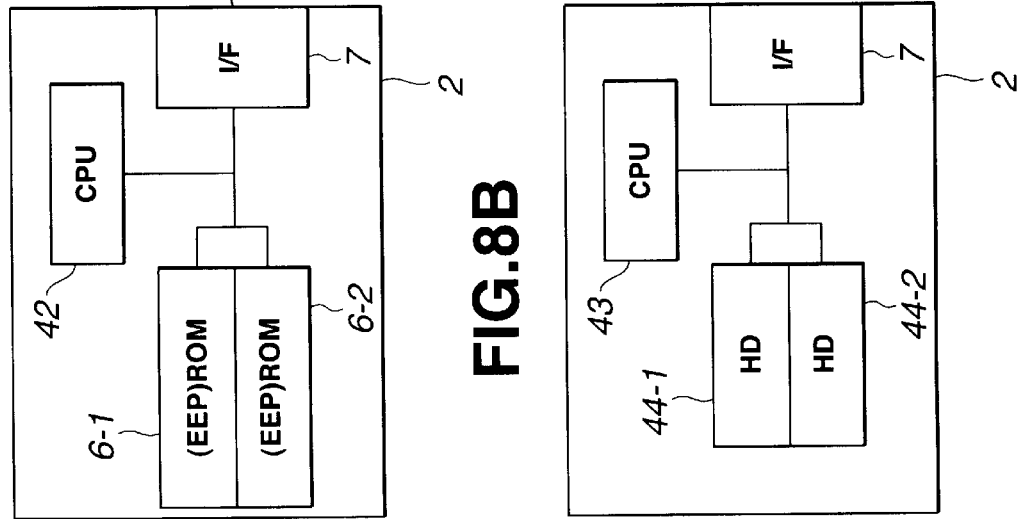
FIG. 8B is a block diagram showing a configuration of medical equipment employed in a variant.

As the program storage means included in the medical equipment 2, two hard disks 44-1 and 44-2 shown in FIG. 8B may be substituted for the ROMs 6-1 and 6-2 shown in FIG. 8A.

Next, actions to be performed to rewrite a program will be described with reference to FIG. 9.

At step S31, with the medical equipment 2 and remote control computer 4 linked over the communication line 5, a rewriting program stored in the hard disk 11 in the remote control computer 4 is transmitted to the CPU 42 in the medical equipment 2 under control of the CPU 43.

The CPU 42 judges at step S32 whether a parameter m indicating the number of times of transmission is an integral (n) multiple of 2 (m=2n), that is, an even number. If the transmission is the first transmission, m=1. Control is therefore passed to step S33. If the transmission is the second transmission (m=2), control is passed to step S35.

At step 533, the CPU 42 rewrites a program stored in the ROM 6-1 using the received data (first program). At the next step S34, the CPU 42 judges whether rewriting has terminated. If the rewriting has terminated normally, this procedure is terminated. If it is judged that the rewriting has not terminated normally, m is incremented by one at step S36 (m=2). Since the stored program has been rewritten incorrectly, a request for transmission of the program is retransmitted to the CPU 43 in the remote control computer 4 (step S37). Control is then returned to step S31.

If it is judged at step S32 that an even number is specified for m, control is passed to step S35. The CPU 42 rewrites the program stored in the ROM 6-2 using the received data (second program). At the next step S34, the CPU 42 judges whether rewriting has terminated normally. If the rewriting has terminated normally, the procedure is terminated. If it is judged that the rewriting has not terminated normally, m is incremented by one (step S36). Since the stored program has been rewritten incorrectly, a request for program transmission is retransmitted to the CPU 43 in the remote control computer 4. Control is then returned to step S31.

Even when the state of transmission over the communication line 5 is unsatisfactory, transmission of a rewriting program is repeated until an old program is rewritten correctly. Consequently, an old program can be rewritten reliably.

Figure 9:
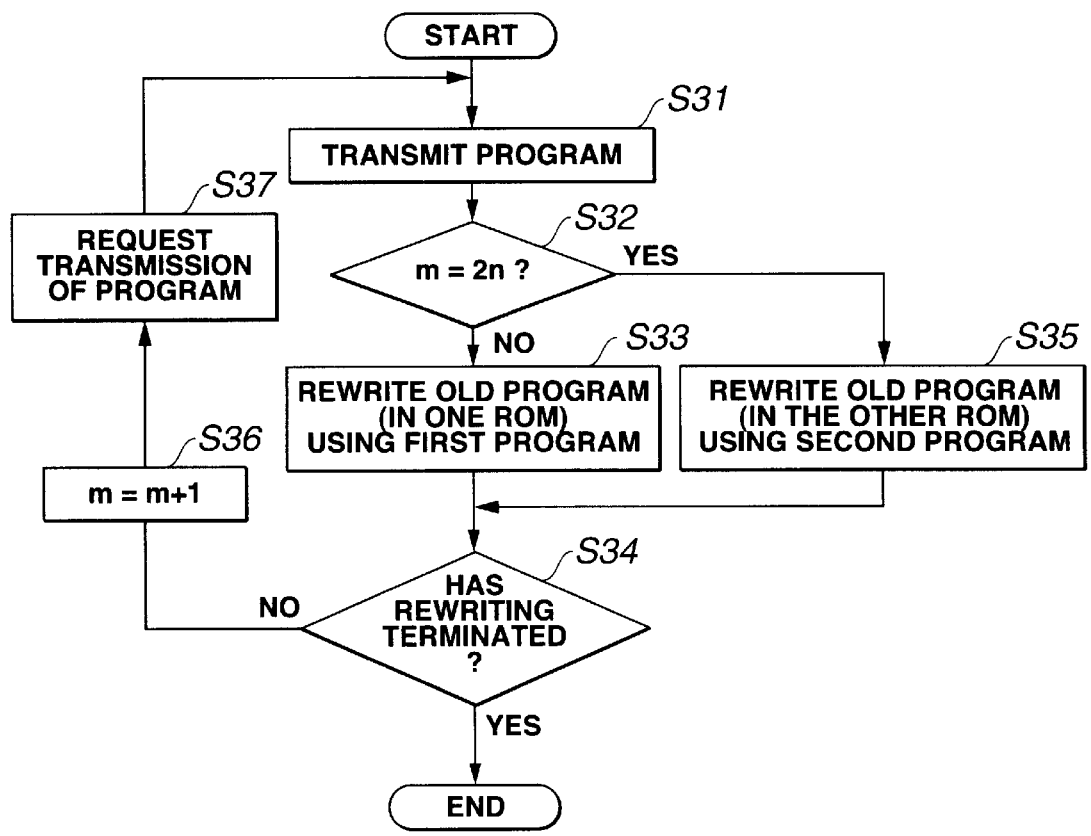

The procedure described in FIG. 9 is associated with the configuration shown in FIG. 8A. When the two hard disks 44-1 and 44-2 are adopted as shown in FIG. 8B on behalf of the ROMs 6-1 and 6-2, the ROM 6-1 in FIG. 9 should be read as the hard disk 44-1, and the ROM 6-2 should be read as the hard disk 44-2.

Instead of alternately rewriting (updating) programs stored in the ROMs, a program stored in one of the ROMs (for example, the ROM 6-1) or one of the hard disks (for example the hard disk 44-1) may be rewritten (updated). When program rewriting (updating) becomes necessary because the version of a program is upgraded, the program stored in the. other ROM (for example, the ROM 6-2) or the other hard disk (for example, the hard disk 44-2) may be rewritten (updated).

Figure 12:
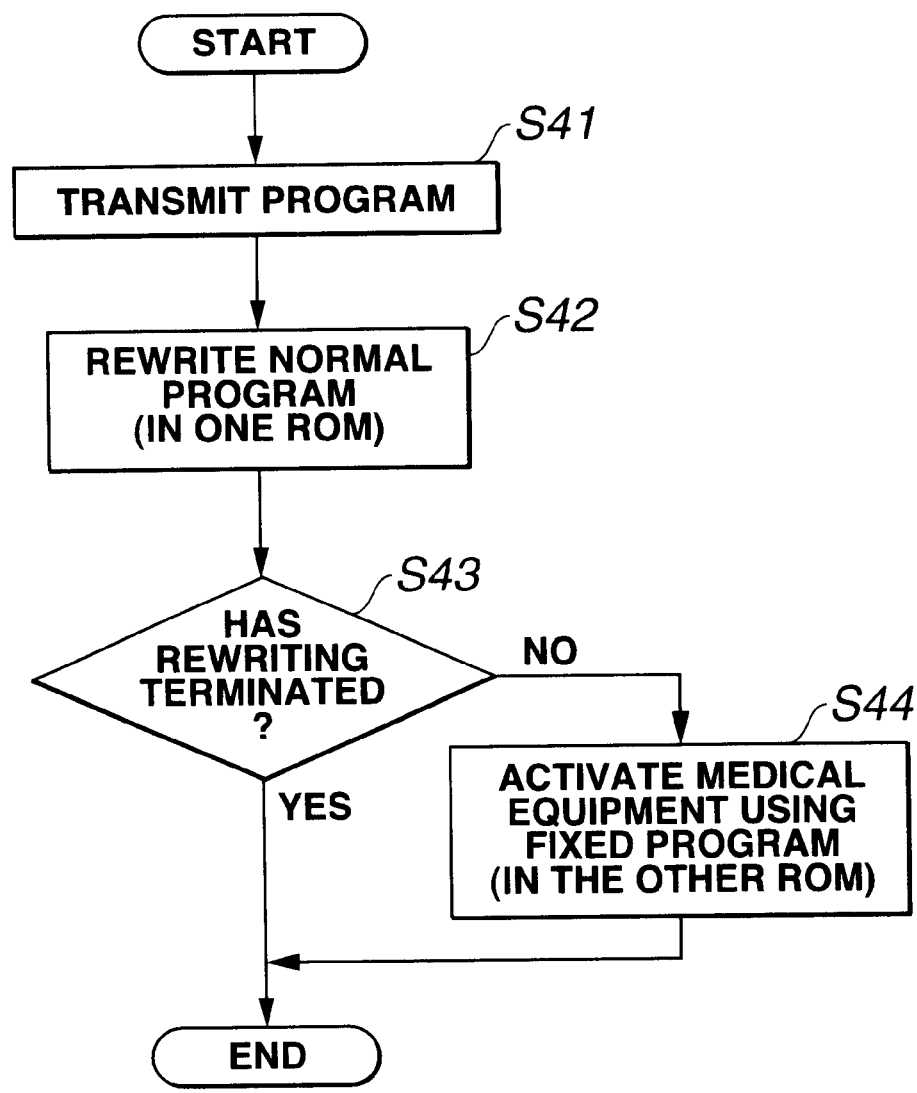

Next, the fourth embodiment of the present invention will be described with reference to FIG. 10 to FIG. 12.

Medical equipment included in a medical apparatus supporting system in accordance with the present embodiment is nearly identical to the one shown in FIG. 8A. However, a fixed program (auxiliary program) incapable of being rewritten and used to control minimum necessary facilities shown in FIG. 11(B) is stored in the ROM 6-2.

On the other hand, the ROM 6-1 is a reprogrammable ROM similarly to the one shown in FIG. 8A, and realized with an EEPROM or the like.

According to the present embodiment, the medical equipment can be activated with the facilities shown in FIG. 11A invoked normally or with the minimum necessary facilities shown in FIG. 11B invoked.

In practice, the facilities to be invoked normally include medical equipment monitoring 46a, centralized medical equipment display 46b, centralized medical equipment control 46c, and comprehensive medical equipment setting 46d. The minimum-necessary auxiliary facilities include the medical equipment monitoring 46a and centralized medical equipment control 46c.

A normal-operation program stored in the ROM 6-1 describes the facilities to be invoked normally. According to the present embodiment, normally, the program stored in the ROM 6-1 alone is rewritten with a received program. If the rewriting is not performed normally, the fixed program stored in the ROM 6-2 is invoked to activate the medical equipment.

Actions to be performed according to the present embodiment will be described with reference to FIG. 12.

The medical equipment 2 is activated while being linked to the remote control computer 4 over the communication line 5. At step S41, a rewriting program stored in the hard disk 11 is transmitted from the remote control computer 4 to the CPU 42 in the medical equipment 2 under control of the CPU 43.

At step S42, the CPU 42 rewrites the normal-operation program using the received program. In practice, the program stored in the ROM 6-1 is rewritten. It is judged at step S43 whether the rewriting has terminated normally. If the rewriting has terminated normally, the procedure is terminated. If the rewriting has not terminated normally, control is returned to step S44. The settings of the medical equipment 2 are altered in order to invoke the fixed or emergency program stored in the ROM 6-2. In other words, although the medical equipment 2 is normally activated with the program stored in the ROM 6-1 when the power supply thereof is turned on, the setting of the CPU 42 is altered to read the fixed program stored in the ROM 6-2 at step S44. The procedure described in FIG. 12 is then terminated.

According to the present embodiment, even if a program should not be able to be rewritten correctly through remote transmission, medical equipment can be activated with a fixed program. The medical equipment can therefore act with at least the minimum necessary facilities invoked.

The program stored in the ROM 6-2 cannot be rewritten remotely. Alternatively, a lid or the like may be formed in the medical equipment 2 and opened in order to replace the ROM 6-2 with another so as to upgrade the version of the program.

Moreover, the ROM 6-2 may be a read-only memory (ROM) that is not reprogrammable, or may be a reprogrammable EEPROM that is write-protected.

Next, the fifth embodiment of the present invention will be described with reference to FIG. 13 to FIG. 15.

Figure 13:
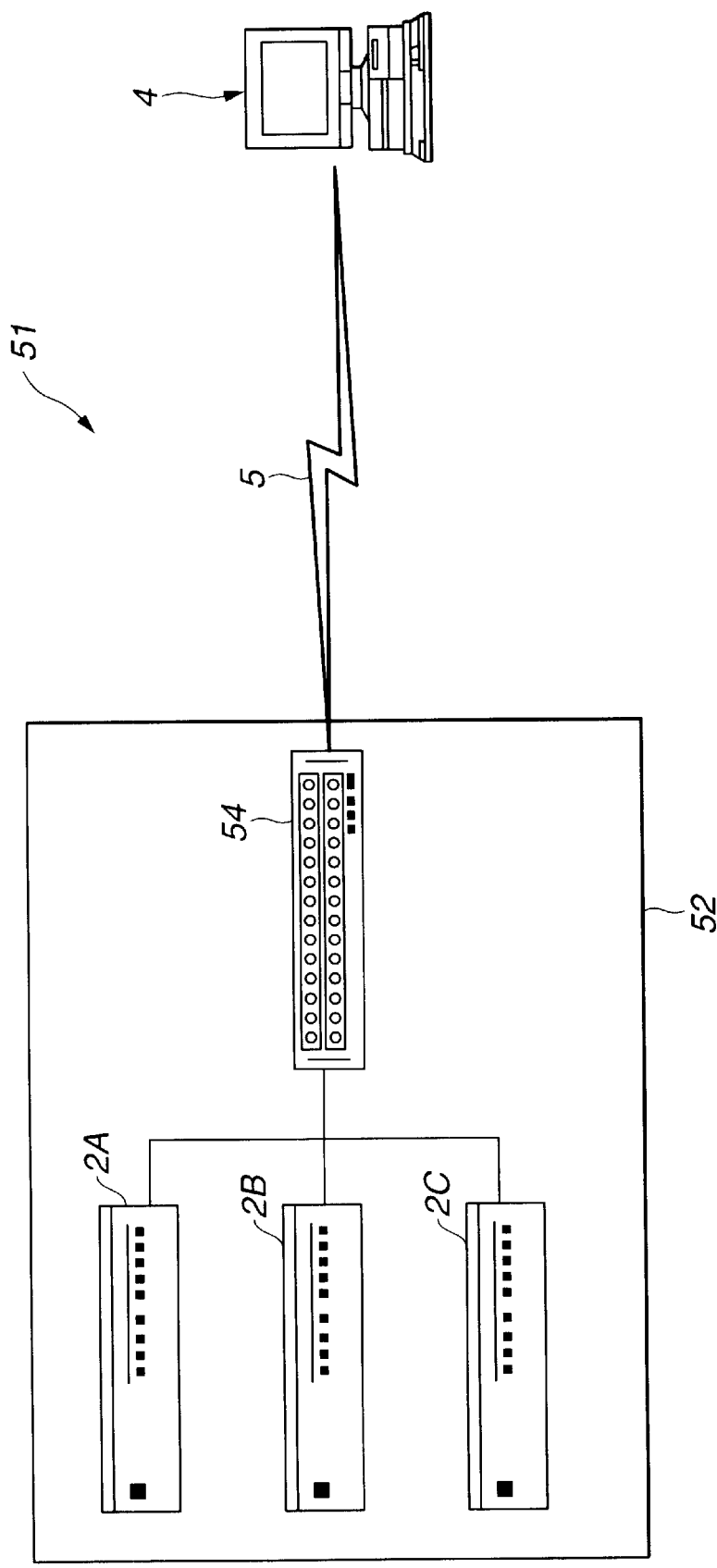
FIG. 13 to FIG. 15 are concerned with the fifth embodiment of the present invention.

A medical apparatus supporting system 51 shown in FIG. 13 has a medical system 52 and the remote control computer 4 linked over the communication line 5. The medical system 52 consists mainly of a plurality of pieces of medical equipment 2A, 2B, and 2C, and a system controller 54 for controlling the plurality of pieces of medical equipment 2A, 2B, and 2C on a centralized basis. The system controller 54 is linked to the remote control computer 54 over the communication line 5.

Figure 14:
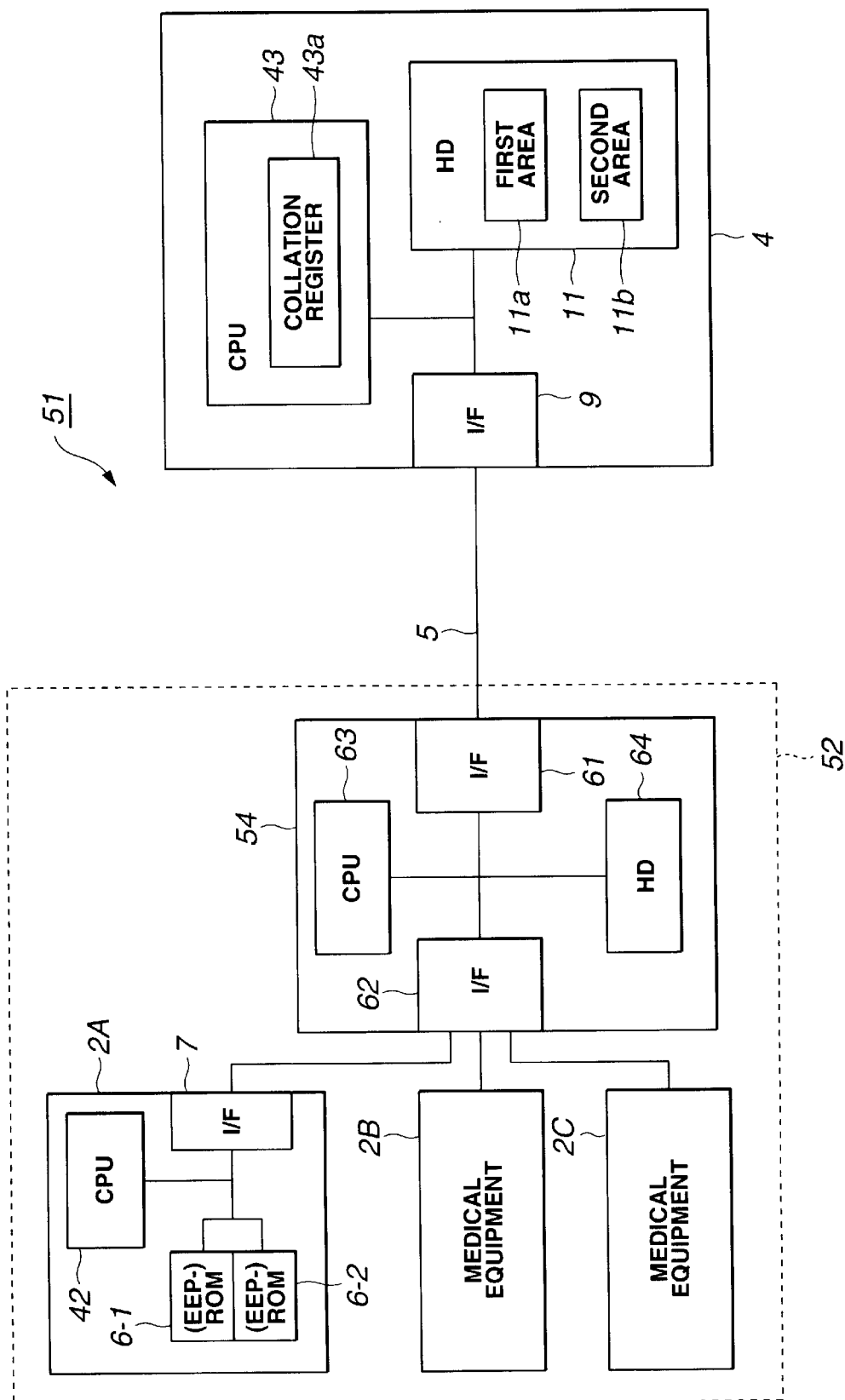

FIG. 14 shows the internal configuration of the medical apparatus supporting system shown in FIG. 13.

A rewriting program stored in a first area 11a in the hard disk 11 incorporated in the remote control computer 4 is transmitted to the system controller 54 in the medical system 52 through the interface 9 over the communication line 5 under control of the CPU 43.

The CPU 43 receives a program returned from the system controller 54, and stores it in a second area 11b in the hard disk 11. The CPU 43 then reads the rewriting program from the first area 11a and the returned program from the second area 11b, and collates the programs in a collation register 43 incorporated therein.

By the way, the system controller 54 consists mainly of an interface 61, an interface 62, a CPU 63, and a hard disk (or a memory such as a RAM) 64. The interface 61 is connected to the communication line 5. The interface 62 enables transfer to or from the medical equipment 2A and others over cables. The CPU 63 controls data transfer to or from the remote control computer 4 and data transfer to or from the medical equipment 2A and others, and manages the medical equipment 2A and others on a centralized basis. The hard disk 64 serves as a storage device in which an operation program instructing the CPU 3 how to act or a transferred program is stored temporarily.

Moreover, the medical equipment 2A has the same configuration as the one shown in FIG. 8A, and includes two reprogrammable (EEP) ROM 6-1 and ROM 6-2. The medical equipment 2B and others also have the same configuration.

Figure 15:
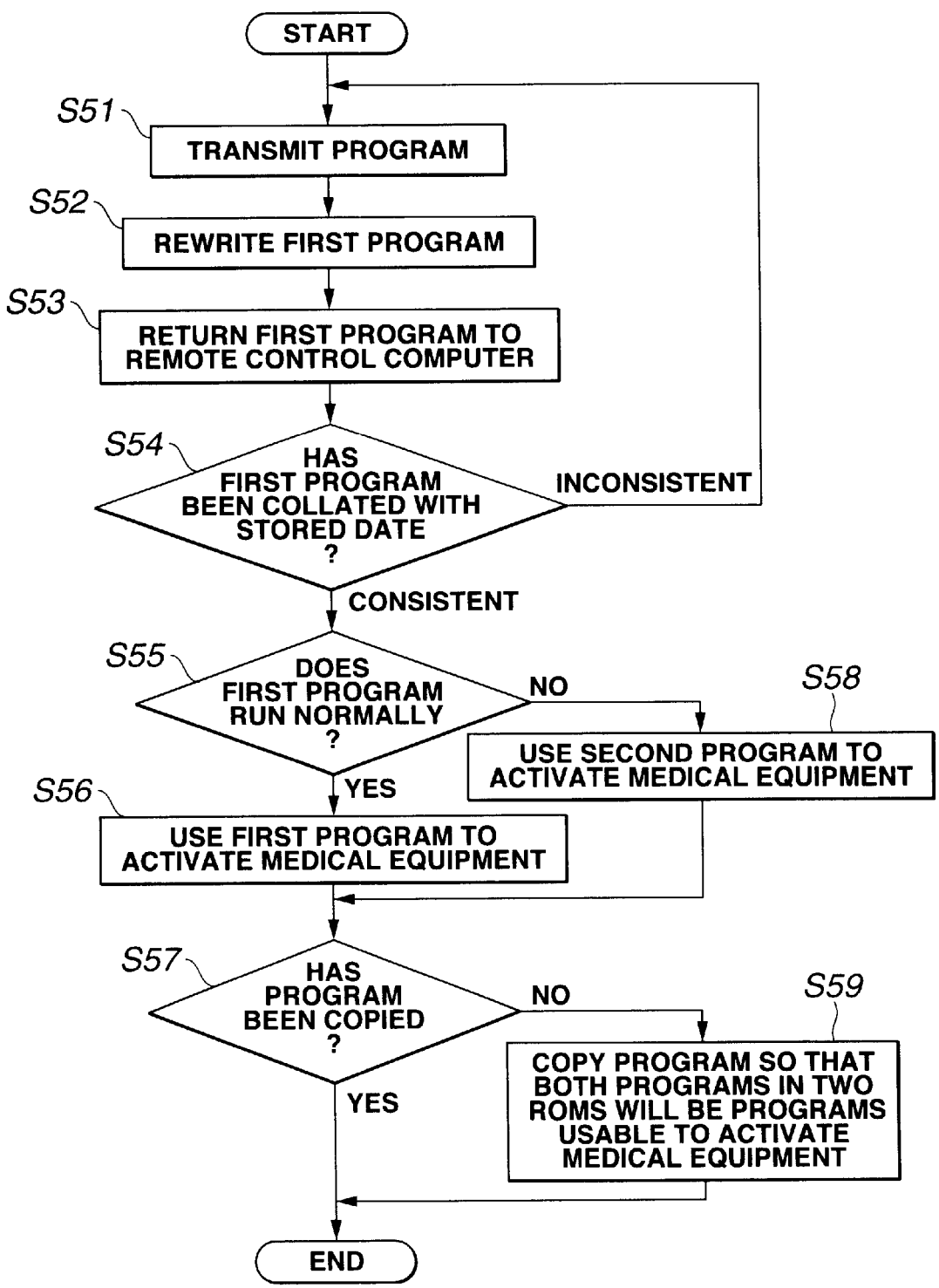

According to the present embodiment, as described in conjunction with FIG. 15, a program sent from the remote control computer 4 is received in order to rewrite a program stored in one of the plurality of memory means included in the medical equipment 2A or the like. The rewritten program is returned to the remote control computer 4. The CPU 43 in the remote control computer 4 collates the returned program with the transmitted program. If the programs are mutually inconsistent, the program is retransmitted.

If the programs are mutually consistent, the medical equipment is activated using the program. It is judged if the medical equipment acts normally. If the medical equipment acts normally, the settings of the medical equipment are altered so that the medical equipment will be activated with the rewritten program. The rewritten program is then copied to the other memory means in order to rewrite the program stored in the other memory means.

If it is judged that the medical equipment acts abnormally, the medical equipment will be activated using the program stored in the other memory means.

Next, actions to be performed in the present embodiment will be described with reference to FIG. 15.

The power supply of the remote control computer 4 is turned on, and the remote control computer 4 is activated. A step S51, a rewriting program is transmitted from the CPU 43 in the remote control computer 4 to the system controller 54 in the medical system 52 over the communication line 5.

At this time, the CPU 43 appends information, with which the medical equipment 2I (where I denotes A, B, or C) to be reprogrammed is specified, to the rewriting program.

If the version of software included in the medical equipment 2I must be upgraded, the system controller 54 may transmit a request signal, which represents a request to upgrade the version of software included in the medical equipment 2I, to the remote control computer 4. The remote control computer 4 may then transmit the software program of the upgraded version to the system controller 54.

At step S52, the CPU 63 in the system controller 54 temporarily stores the received program in the hard disk 64, transfers it to the medical equipment 2I to be reprogrammed at a proper bit rate, and sends a rewriting signal to the medical equipment 2I. The medical equipment 2I (CPU 42 in the medical equipment) rewrites the first program stored in one (for example, the ROM 6-1) of the two ROMs 6-1 and 6-2 included in the medical equipment 2I.

After the rewriting is completed, the CPU 42 returns the first program to the remote control computer 4 via the system controller 54 at step S53.

At step S54, the CPU 43 in the remote control computer 4 stores the returned program in the second area 11b in the hard disk 11. The CPU 43 then uses the collation register 43a to collate (compare) the first program stored in the second area 11b with the rewriting program stored in the first area 11a.

If the results of collation reveal that the programs are mutually inconsistent, control is passed to step S51. The processing of steps S51 to S54 is repeated. If the results of collation reveal that the programs are mutually consistent, a signal indicating that the programs are mutually consistent is transmitted to the system controller 54.

At step S55, the CPU 42 in the medical equipment 2I judges whether the first program runs normally. For example, the medical equipment 2I is reset and provisionally set so that it will be activated with the first program. It is then judged whether the medical equipment acts normally.

If it is judged that the first program runs normally, the settings of the medical equipment is altered at step S56 so that the medical equipment will be activated with the first program. Control is then returned to step S57. If it is judged that the first program runs abnormally, the settings of the medical equipment are altered so that the medical equipment will be activated with the second program stored in the other ROM and not rewritten. Control is then passed to step S57.

At step S57, it is judged whether a program used to activate the medical equipment has been copied. If the program has been copied, the rewriting is terminated. If the program has not been copied, a program stored in one of the two ROMs 6-1 and 6-2 and used to activate the medical equipment is copied to the other ROM at step S59. Consequently, the program used to activate the medical equipment is stored in both the ROMs 6-1 and 6-2. The rewriting is then terminated.

Specifically, if the settings of the medical equipment are altered so that the medical equipment will be activated with a program stored in the ROM 6-1, the program is copied to the ROM 6-2 at step S59. If the settings of the medical equipment are altered so that the medical equipment will be activated with a program stored in the ROM 6-2, the program is copied to the ROM 6-1. Consequently, both the programs stored in the ROMs 6-1 and 6-2 are programs with which the medical equipment is activated normally.

According to the present embodiment, an actually rewritten program is returned to a program transmission source. It is then judged whether the rewritten program is consistent with a transmitted rewriting program. If he programs are mutually inconsistent, transmission of the rewriting program is repeated. Consequently, an old program can be reliably rewritten using a program that must be transmitted.

Moreover, it is judged if the rewritten program runs normally. If it is judged that the rewritten program runs abnormally, a program that has not been rewritten is used to activate the medical equipment. If the rewritten program contains a new bug, it runs abnormally. Even in this case, the program that has not been rewritten can be used to activate the medical equipment.

In this case, the program that has not been rewritten may contain a bug to be removed. For removing the bug, a rewriting program may be transmitted in order to upgrade the version of the program. However, the rewriting program may contain another bug and may be judged to run abnormally. In this case, the old program that has not been rewritten may be used to activate the medical equipment. However, since the bug is revealed in detail, although the facilities are limited in order to avoid the adverse effect of the bug, the medical equipment can be activated reliably.

Before program rewriting is terminated, copying is performed so that the programs stored in both the ROMs 6-1 and 6-2 will be programs that run normally. Even if it becomes necessary to resume the program rewriting in the future, the program rewriting can be carried out smoothly because the stored programs run normally.

As mentioned above, when a program installed in the medical equipment 2I must be rewritten or updated, the CPU 42 included in the medical equipment 2I controls rewriting or updating. Alternatively, the CPU 54 in the system controller 54 may control on a centralized basis rewriting or updating of programs stored in the ROM 6-1 and ROM 6-2 that are storage devices included in any piece of medical equipment 2I.

In the system 51 shown in FIG. 13 or FIG. 14, each piece of medical equipment 2I may act as described in the flowchart of FIG. 9. In this case, since the system controller 54 serving as a repeater is interposed between the medical equipment 2I and remote control computer 4, a rewriting/updating program sent from the remote control computer 4 is subjected to summation check or the like and then stored in the hard disk 64 included in the system controller 54. If a bug is detected in the received program through the summation check, the remote control computer 4 may be asked to retransmit the program.

If the program can be received without occurrence of a bug, the program may be transmitted to the medical equipment 2I in order to rewrite or update an old program installed in the medical equipment.

Next, the sixth embodiment of the present invention will be described with reference to FIG. 16. According to the present embodiment, in the system shown in FIG. 8A, a rewriting program to which a local assessment program is appended is transmitted from the remote control computer 4 to the medical equipment 2. The medical equipment 2 locally assesses itself before a program installed therein is rewritten.

Actions to be performed will be described with reference to the flowchart of FIG. 16.

Figure 16:
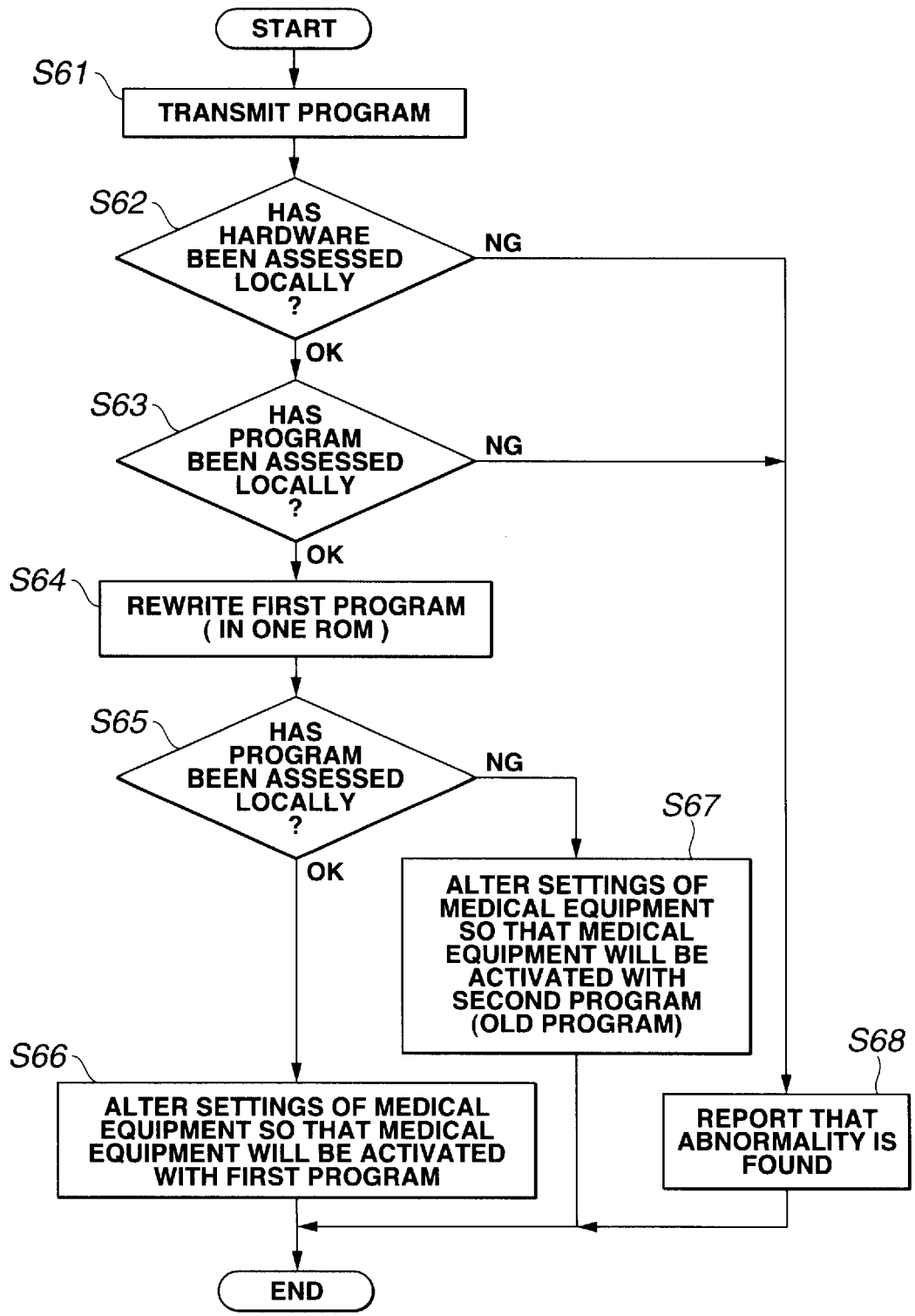
FIG. 16 is a flowchart describing actions to be performed in the sixth embodiment of the present invention.

As described in FIG. 16, the medical equipment is activated with the power supply thereof turned on. At step S61, a rewriting program to which a local assessment program is appended is transmitted from the remote control computer 4 to the medical equipment 2.

At step S62, before the received program is used to rewrite an old program, the CPU 42 in the medical equipment 2 locally assesses hardware components thereof.

If the results of local assessment of hardware reveal that the hardware is no good or abnormal, it is reported to the remote control computer 4 at step S68 that an abnormality is found. The procedure is then terminated.

If the results of local assessment reveal that the hardware is OK, the received program is assessed locally at step S63. If the results of assessment reveal that the received program is no good, it is reported to the remote control computer 4 at step S68 that an abnormality is found.

In contrast, if it is judged that the received program is correct or OK, an old program stored in one of the ROMs (for example, the ROM 6-1) is rewritten using the received program at step S64 (in FIG. 16, the first program is rewritten). After the rewriting is completed, the rewritten program is locally assessed at step S65.

If it is judged that the rewritten program is correct or OK, the settings of the medical equipment are altered so that the medical equipment will be activated with the rewritten program that is the first program. The rewriting is then terminated. In contrast, if it is judged that the rewritten program is no good, the settings of the medical equipment are altered so that the medical equipment will be activated with a second program stored in the other ROM 6-2. The procedure is then terminated.

According to the present embodiment, before an old program is rewritten using a received rewriting program, hardware and the received program are assessed locally. After rewriting is completed, the rewritten program is assessed locally. Consequently, it can be assessed reliably whether the medical equipment 2 acts normally.

Moreover, if it is judged through local assessment that the rewritten program is no good, the settings of the medical equipment are altered so that the medical equipment will be activated with an old program stored in the other ROM and not rewritten. Even if program rewriting or updating fails, the medical equipment can be activated normally.

According to the present embodiment, the medical equipment 2I is locally assessed on receipt of a rewriting program. The present invention is not limited to this mode. Alternatively, the medical equipment 2I may be locally assessed in advance. If the results of local assessment reveal that the medical equipment acts normally, an old program installed in the medical equipment may be overwritten (rewritten) with the received program.

Incidentally, embodiments constructed by replacing part of an aforesaid embodiment with part of another aforesaid embodiment or combining the aforesaid embodiments shall belong to the scope of the present invention.

Figure 17:
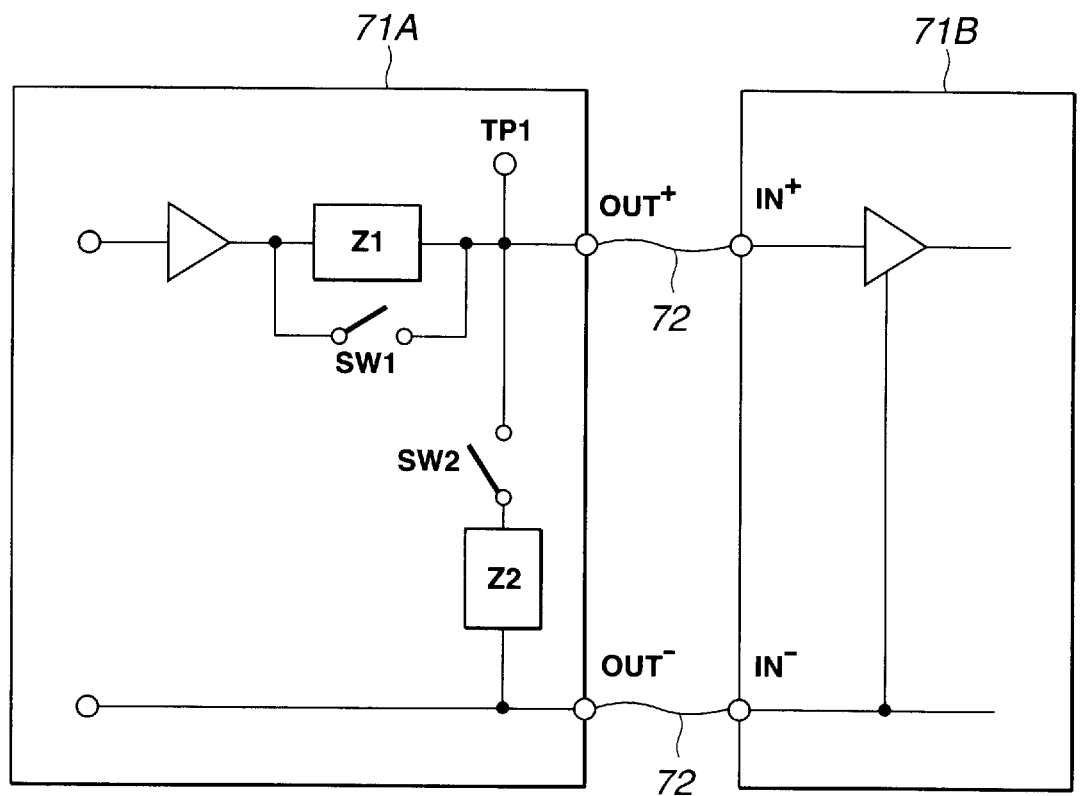
FIG. 17 shows configurations of pieces of medical equipment a cable connection between which is checked.

When equipment 71A and equipment 71B shown in FIG. 17 are connected over cables 72 to constitute a system, it may be judged whether the cables 72 are disconnected.

(A) In this case, a cable check mode may be defined independently of a normal operation mode.

In the equipment 71A, an impedance device Z1 is connected in series with an output port with a (transmission) buffer between them. The impedance device Z1 is made or broken by turning on or off a switch SW1 connected to both terminals of the impedance device. An impedance device Z2 is connected between output ports connected to the two cables 72, and made or broken by turning on or off a switch SW2.

The impedance devices Z1 and Z2 are designed to offer an impedance that is no negligible relative to an impedance (correct value when a cable is not disconnected) induced at each input port of the equipment 71B through which data sent through the output port of the equipment 71A is fed to the equipment 71B. Moreover, a (reception) buffer is connected to the input ports of the equipment B.

When the cable check mode is established, the switch SW1 is turned off and the switch SW2 is turned on. A voltage developed at a point TP1 is sensed. The voltage at the point TP1 varies depending on whether the cables 72 are disconnected. Therefore, whether the cables 72 are disconnected can be detected by checking the voltage at the point TP1.

(B) A means may be included for remotely switching the normal operation mode and cable check mode over a communication line (irrespective of wire communication or radiocommunication).

In this case, the switches SW1 and SW2 are realized with optical couplers.

As mentioned above, when the cable check mode is defined, a sensing means that works without hindering normal actions can be realized in order to judge whether a cable is disconnected.

Next, embodiments of the present invention to be described below are concerned with a medical system having a plurality of pieces of medical equipment interconnected over cables over which signals are transmitted. In the system as well as the system shown in FIG. 17, even if any cable is disconnected, the disconnection can be coped with efficiently. The embodiments are indented to provide a medical system making it possible to locate a disconnected cable without the necessity of visiting an installation site of a system or collecting the system to check a phenomenon. Moreover, the medical system makes it possible to obviate the necessity of time-consuming disconnection checking labor, reduce man-hours, shorten a maintenance time, and thus immediately provide a service for a user.

An endoscopic medical system 81 shown in FIG. 18 has a TV camera controller 110a, a light source unit 111a, an electric cautery 112, a pneumoperitoneum unit 113, and a video tape recorder (hereinafter VTR) 114 integrated into a cart 120. These medical apparatuses are connected to a system controller 100 for controlling the whole system on a centralized basis.

A surgical procedure to be performed under endoscopic observation requires many medical apparatuses that cannot be integrated into one cart. The medical apparatuses are therefore divided into a plurality of carts. According to the present embodiment, aside from the above medical apparatuses, a TV camera controller 110b, a light source unit 111b, and an image processing unit 115 are integrated into a cart 130 and connected to a repeater unit 101. The repeater unit 101 communicates with the system controller 100 over an indirect communication cable 102.

The medical apparatuses connected to the system controller 100 transmit data to the system controller 100 over communication cables. When the system controller 100 is communicating with the medical apparatuses, the medical apparatuses can be operated via the system controller 100 using a centralized operator panel 103 to be handled by a nurse or the like lying in an unsterilized area, or using a remote controller 104 to be handled by a surgeon lying in a sterilized area.

Video information produced by the TV camera controllers 110a and 110b is displayed on observation monitors 116a and 116b mounted on the carts 120 and 130 respectively. Various data items are selectively displayed on centralized display panels 105a and 105b attached to the side surfaces of the observation monitors 116a and 116b.

Next, cable connections among the medical apparatuses will be described by taking for instance cable connections of the system controller 100 mounted in the cart 120 to the TV camera controller 110a and light source unit 111a.

Figure 19:
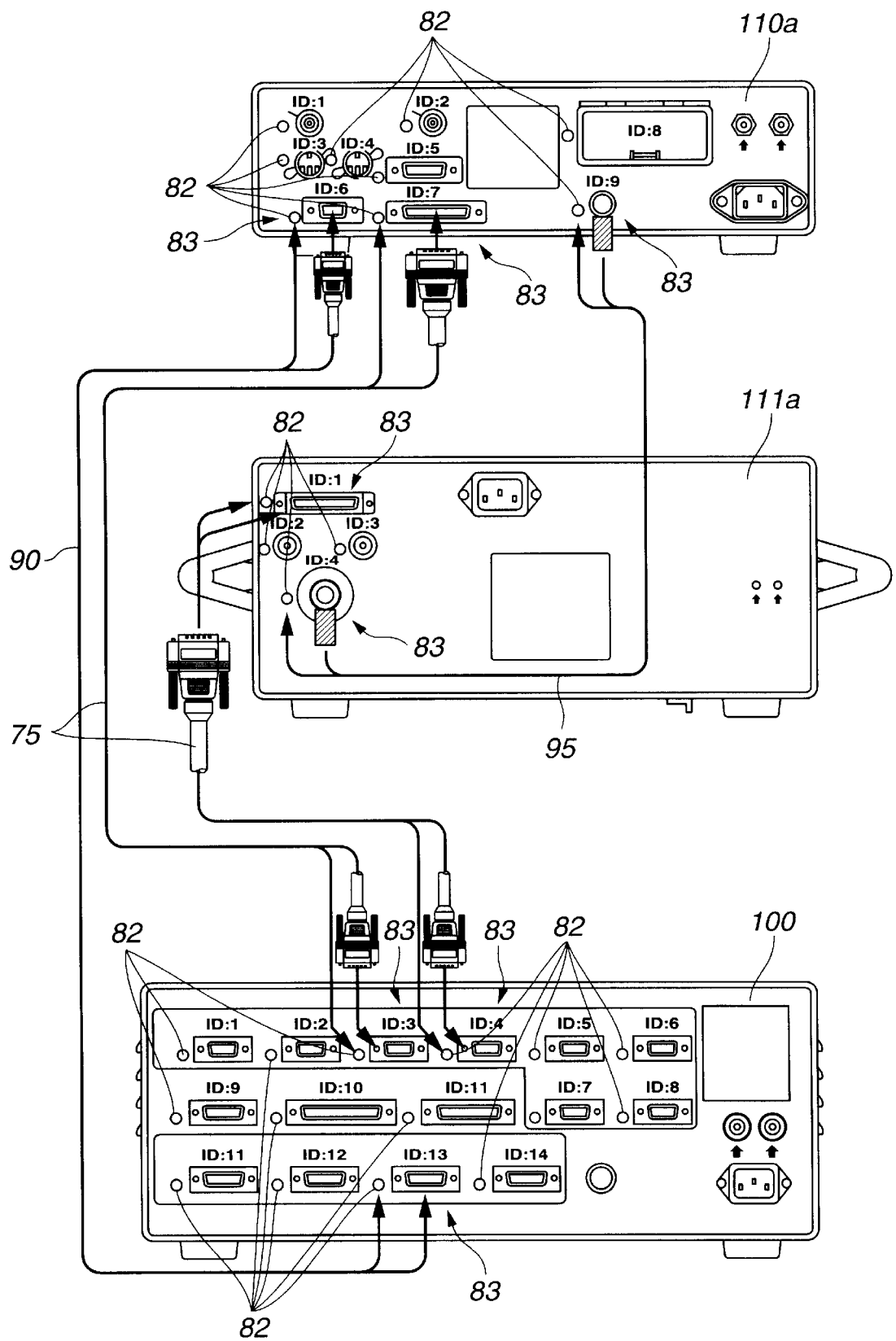
FIG. 19 is an explanatory diagram showing connections among a system controller, a TV camera controller, and a light source unit shown in FIG. 18.

As shown in FIG. 19, each of terminals 83 formed in the system controller 100, TV camera controller 110a, and light source unit 111a includes an inherent control terminal and a communication terminal 82 which are plugged with a control cable 75.

Moreover, each of terminals 83 formed in the system controller 100 and TV camera controller 110a includes an inherent video terminal and a communication terminal 82 which are plugged with a video cable 90.

Furthermore, each of terminals 83 formed in the TV camera controller 110a and light source unit 111a includes an inherent light adjustment terminal and a communication terminal 82 which are plugged with a light adjustment cable 95.

Figure 21:
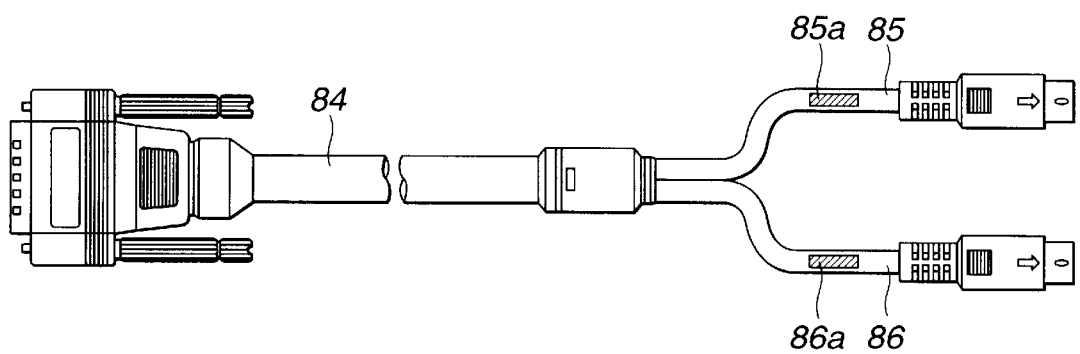
FIG. 21 shows the appearance of a cable to explain the structure thereof.

The cables 75, 90, and 95 for interconnecting the medical apparatuses 100, 110a, and 111a are structured similarly to a cable 84 shown in FIG. 21. The cable 84 has a communication cable 85 and a data transmission cable 86. The cables 85 and 86 have LEDs 85a and 86a, which are lit when communication is disabled because of disconnection, embedded therein.

Unique ID numbers are assigned to the medical apparatuses 100, 110a, and 111a. Moreover, ID numbers are assigned to the terminals 83 formed in the apparatuses.

Figure 20:
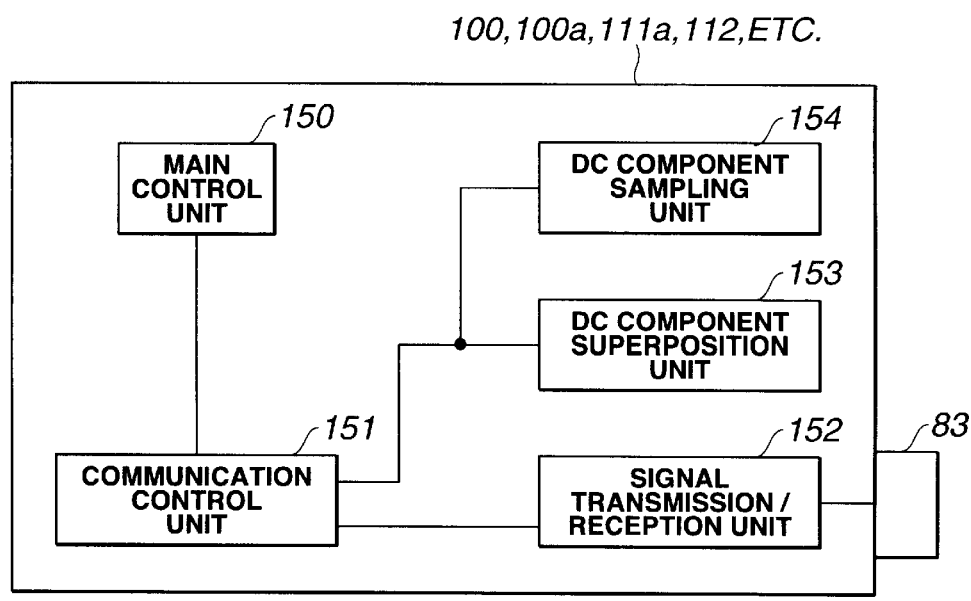
FIG. 20 is a conceptual diagram of a control unit incorporated in the system controller or any other apparatus shown in FIG. 18.

As shown in FIG. 20, the medical apparatuses 100, 110a, and 111a each internally include a main control unit 150, a communication control unit 151 for controlling communication, a signal transmission/reception unit 152 for transmitting or receiving signals, a dc component superposition unit 153, and a dc component sampling unit 154. A control device composed of these units transmits or receives a signal through the terminals 83 formed in each medical apparatus.

In the medical apparatuses including the system controller 100, the control device exerts the ability of each medical apparatus and executes a cable disconnection checking procedure to be described later. The control device thus checks the connected state of the cable 84 (if the data transmission cable 86 is connected to the inherent control terminal of each apparatus and the communication cable 85 is connected to the communication terminal thereof). When the cable 84 is connected to a proper medical apparatus, it is judged whether the data transmission cable 86 and communication cable 85 included in the cable 84 are disconnected. The results of judgment are output and indicated using the observation monitor 116a or 116b serving as a disconnection reporting means. The control unit realizes such facilities as a connected state recognizing means and a disconnection judging means.

Figure 22:
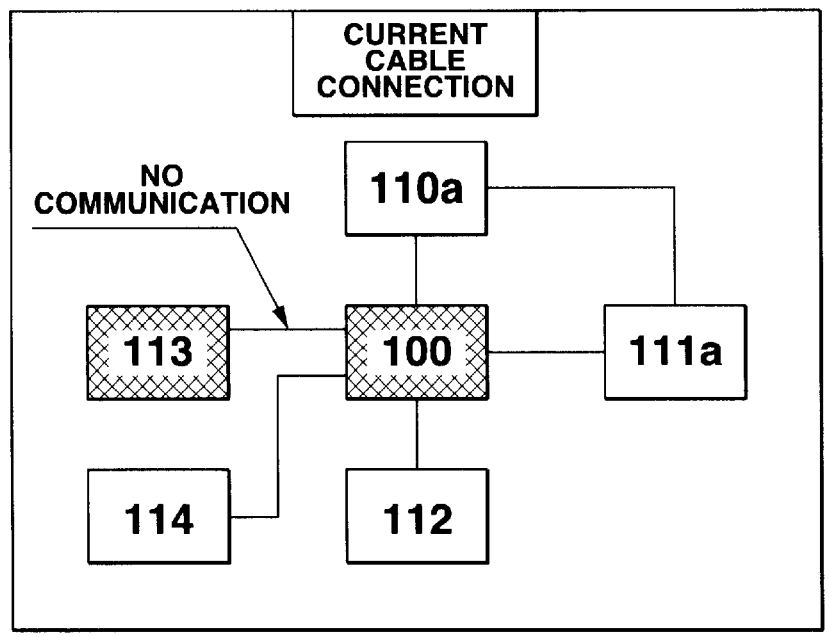
FIG. 22 is an explanatory diagram concerning a monitor screen indicating that a communication cable is disconnected.

If the communication cable 85 of the cable 84 is disconnected, a message "No communication" or the like is, as shown in FIG. 22, displayed in a graphic showing cable connections among medical apparatuses on the observation monitor 116a or 116b. Moreover, a disconnected cable may be indicated using red or any other color different from the color of the other cables.

Figure 23:
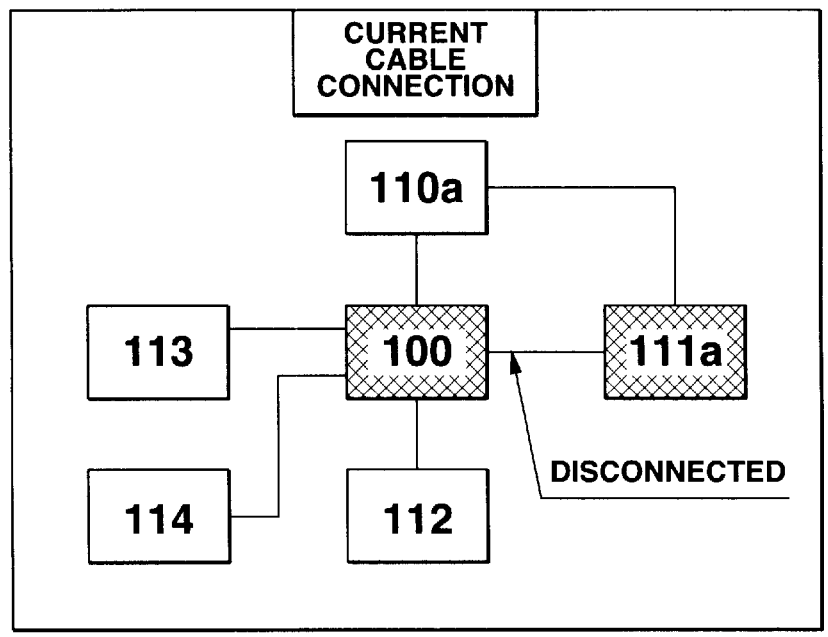
FIG. 23 is an explanatory diagram concerning a monitor screen indicating that a data transmission cable is disconnected.

If the data transmission cable 86 of the cable 84 is disconnected, a message "Disconnected" or the like is, as shown in FIG. 23, displayed in the graphic showing cable connections among medical apparatuses. Moreover, a disconnected cable may be indicated using red or any other color different from the color of the other cables.

The system 81 is an endoscopic medical system having a plurality of medical apparatuses connected using signal transmission means. The system 81 includes a connected state recognizing means, a disconnection judging means, and a disconnection reporting means. The connected state recognizing means recognizes the connected states of the signal transmission means. When the connected state recognizing means recognizes that the signal transmission means are connected to the associated medical apparatuses, the disconnection judging means judges whether any signal transmission means is disconnected. The disconnection reporting means reports disconnection information concerning the signal transmission means according to the results of judgment made by the disconnection judging means.

Figure 24:
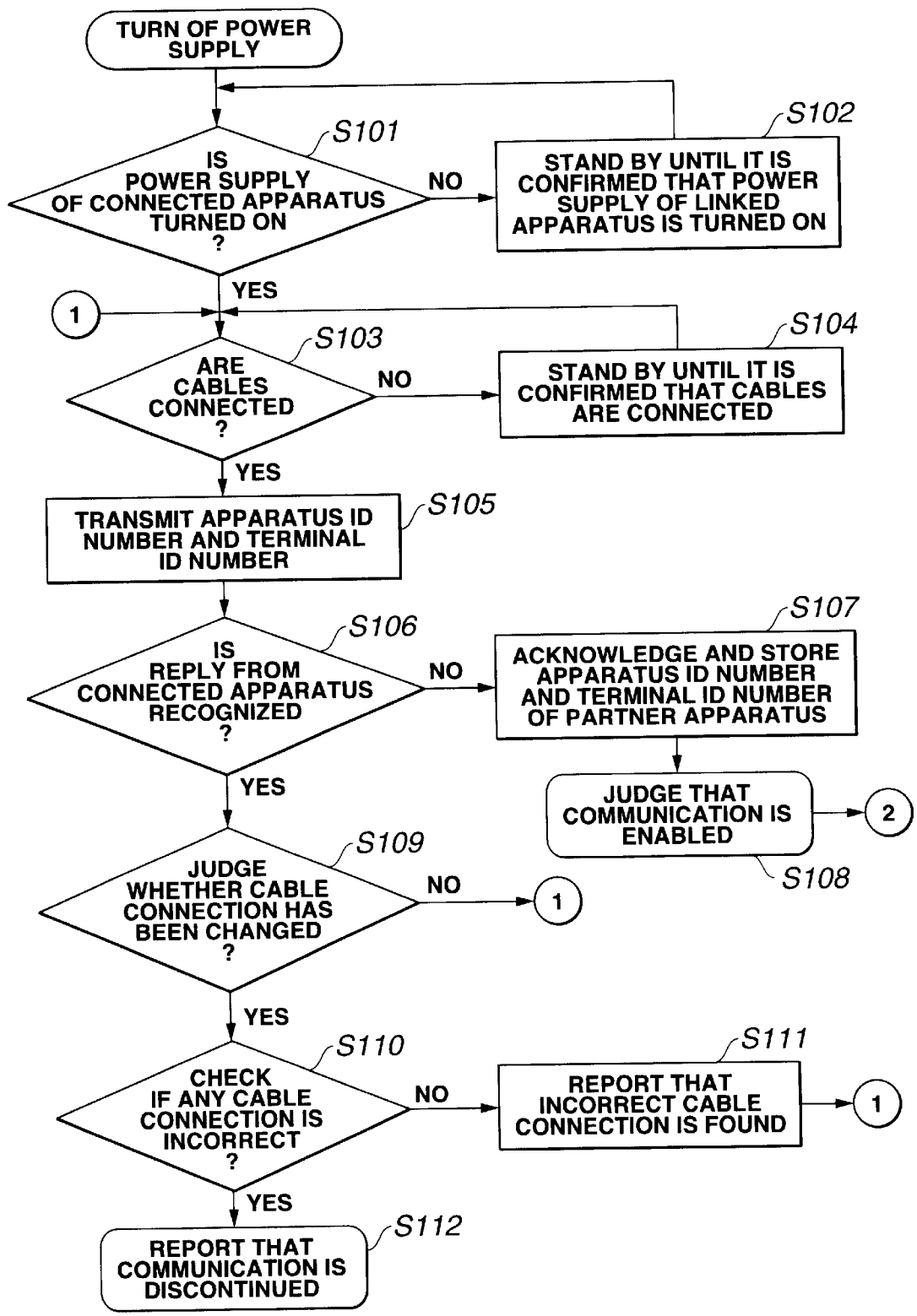
FIG. 24 is a flowchart describing a procedure of checking if a cable is disconnected.
Figure 25:
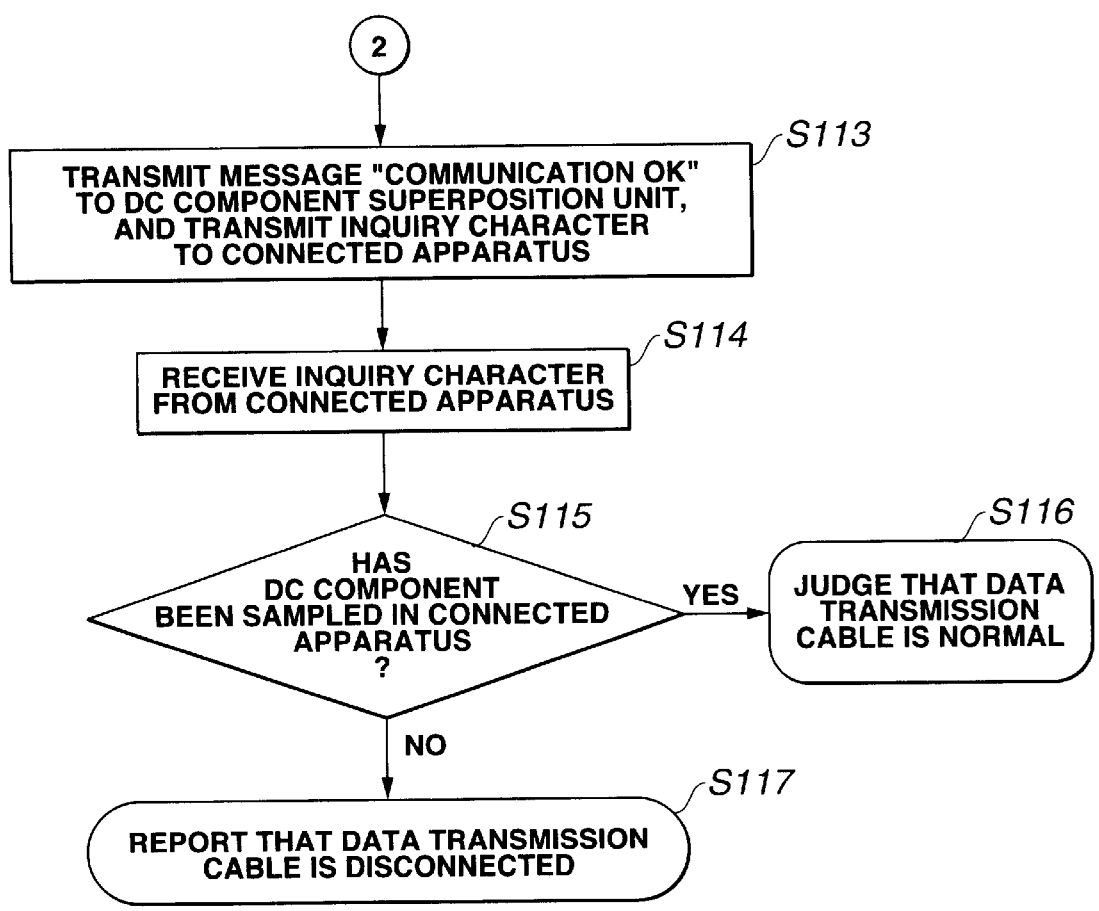
FIG. 25 is a flowchart describing the sequel of the procedure described in FIG. 24.

Next, a cable disconnection checking procedure will be described in conjunction with the flowcharts of FIG. 24 and FIG. 25. The procedure is executed with the power supply of an apparatus turned on. First, at step S101, it is judged whether the power supply of a connected apparatus is turned on. If the power supply of the connected apparatus is turned off, control is passed to step S102. A standby state is retained until the power supply of the connected apparatus is turned on.

If it is judged at step S101 that the power supply of the connected apparatus is turned on, control is passed to step S103. It is checked if a cable connection has been established. If any cable connection is not recognized, control is passed to step S104. A standby state is retained until a cable connection is recognized.

If a cable connection is recognized at step S103, control is passed to step S105. A transmitting apparatus transmits an apparatus ID number and a terminal ID number. Control is then passed to step S106.

It is judged at step S106 whether the connected apparatus has returned as a reply an apparatus ID number and a terminal ID number. If the connected apparatus has not returned the reply, control is passed to step S107. The apparatus ID number and terminal ID number of the partner are stored in the RAMs of the connected apparatus and transmitting apparatus respectively. It is then judged at step S108 that the apparatuses are ready to communicate with each other.

If it is judged at step S106 that the connected apparatus has not returned as a reply an apparatus ID number and terminal ID number, control is passed to step S109. It is judged whether the cable connection between the apparatuses has been changed. If so, control is returned to step S103.

If it is judged at step S109 that the cable connection between the apparatuses has not been changed, control is passed to step S110. It is checked if the cable connection is incorrect. If it is recognized that the cable connection is incorrect, control is passed to step S111. It is reported that the cable connection is incorrect. Control is returned to step S103, and the subsequent processing is resumed.

If it is judged at step S110 that the cable connection is correct but the apparatus ID number and terminal ID number of the connected apparatus cannot be acknowledged, control is passed to step S112. It is judged that the communication cable 85 of the cable 84 is disconnected. The fact is reported by displaying the aforesaid message shown in FIG. 22 on the observation monitor 116a or 116b.

As mentioned above, apparatuses to be connected to each other communicate with each other through the communication terminals 82. The cable connections among all the apparatuses are checked or monitored based on the apparatus ID numbers unique to the apparatuses and the terminal ID numbers unique to the terminals 83 of the apparatuses.

Moreover, the LED 85a is embedded in the communication cable 85 of the medical cable 84. When communication is disabled because of disconnection, the LED 85a is extinguished. When disconnection is reported using the observation monitor 116a or 116b, the fact can also be discerned through the LED. A RAM is used as a storage medium in which an apparatus ID number and a terminal ID number are stored. Alternatively, a hard disk drive, a PC card, or any other storage medium will do.

If it is judged at step S108 that the apparatuses are ready to communicate with each other, control is passed to step S113. In the transmitting apparatus, the communication control unit 151 processes a signal. The dc component superposition unit 153 superposes a dc component on data to be transmitted over the data transmission cable 86 according to the processed information. An inquiry character is transmitted to the connected apparatus over the communication cable 85.

Control is then passed to step S114. The inquiry character sent from the connected apparatus is received. The dc component sampling unit 154 in the connected apparatus samples the dc component of the transmitted data signal and detects the voltage level of the dc component.

At step S115, the communication control unit 151 in the connected apparatus processes the signal, judges whether the dc component has been sampled. If the dc component has been sampled, control is passed to step S116. It is judged that the data transmission cable 86 is normal. The connected apparatus returns an acknowledge character to the transmitting apparatus over the communication cable 85.

In contrast, if it is judged at step S115 that the dc component has not been sampled, it means that the dc component received by the connected apparatus is low. Control is passed to step S117. An acknowledge character indicating that the dc component is low is transmitted to the transmitting apparatus over the communication cable 85. Consequently, it is reported using the observation monitor 116a or 116b that the data transmission cable is disconnected.

The LED 86a is embedded in the data transmission cable 86 of the medical cable 84. If communication is disabled because of disconnection, the LED 86a is extinguished. When disconnection is reported using the observation monitor 116a or 116b, the disconnection can be discerned through the LED.

As mentioned above, apparatuses to be connected to each other communicate with each other through the communication terminals 82. Based on the apparatus ID numbers unique to all the apparatuses and the terminal ID numbers unique to the terminals 83 of the apparatuses, it can be checked if all the data transmission cables 86 are disconnected.

According to the present embodiment, the observation monitors 116a and 116b are used as the disconnection reporting means. Alternatively, the centralized display panels 105a and 105b will do. Otherwise, voice or a buzzer sound may be utilized for reporting.

As mentioned above, according to the present embodiment, even if a cable is disconnected, a user or a staff member working for a manufacturer or a purchaser will not be bothered with the time-consuming disconnection checking labor to be performed using a tester or the like. This leads to reduced man-hours. Moreover, the user's complaint can be coped with quickly. Moreover, cable connections among apparatuses can be checked readily. Even if any cable connection is incorrect, it is unnecessary to check the cable connections one by one in consultation with a cable connection diagram or a manual. This results in a system enjoying superb maintainability.

Figure 18:
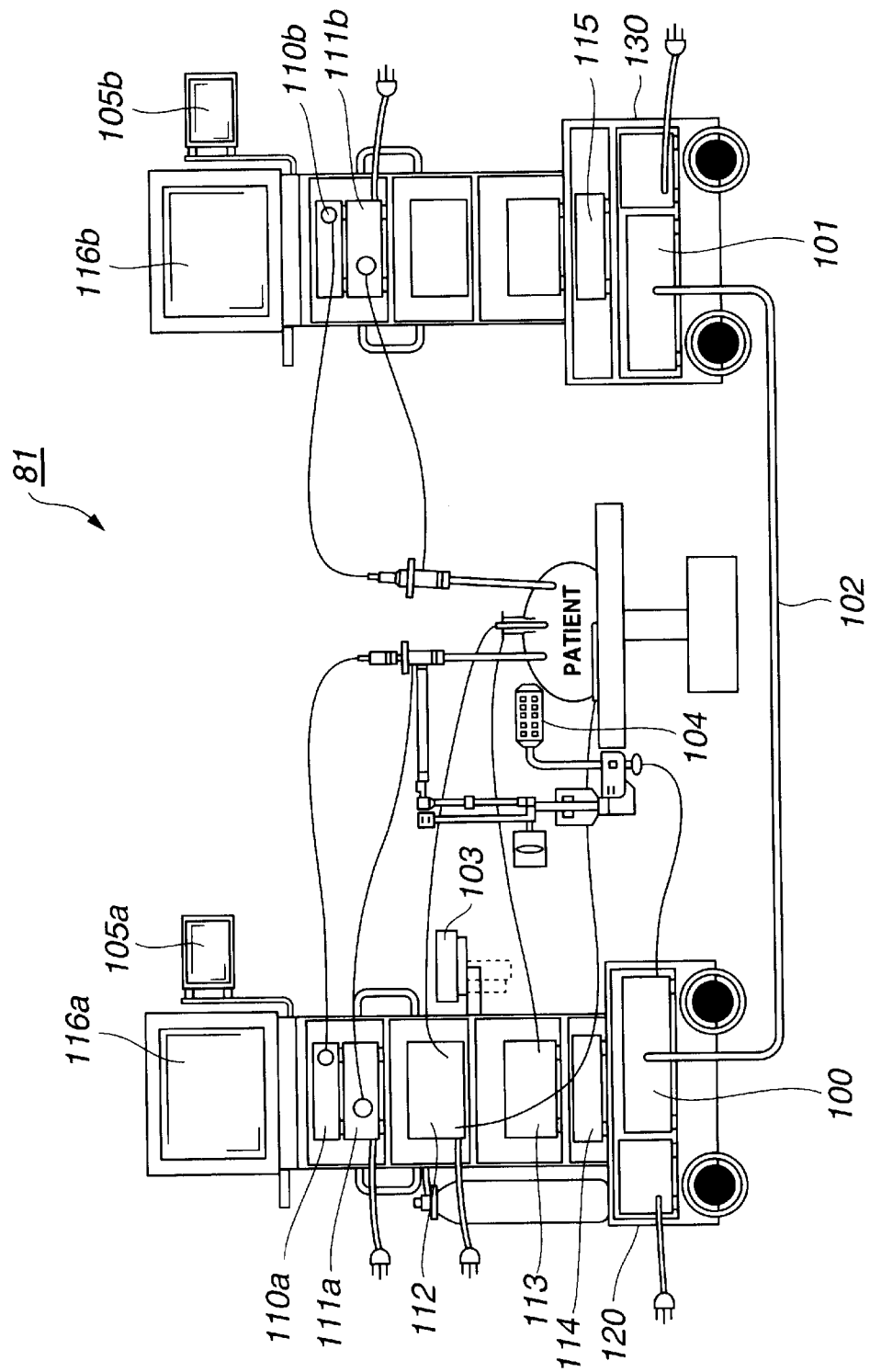
FIG. 18 shows an overall configuration of an endoscopic medical system utilizing an endoscope and having a facility for judging if a cable is disconnected.
Figure 26:
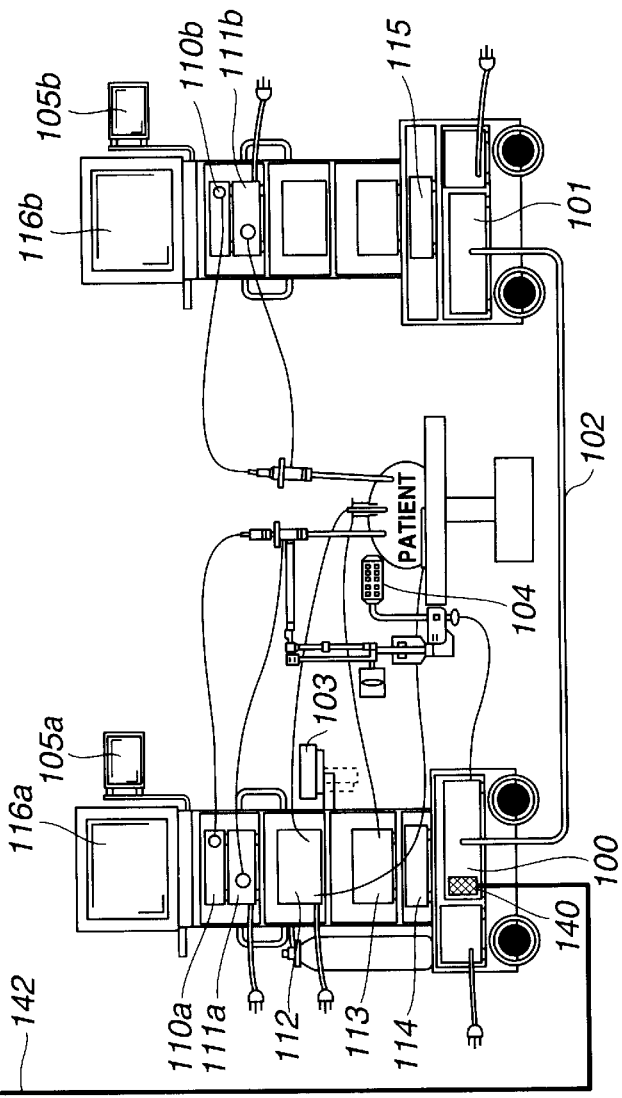
FIG. 26 shows an overall configuration of an endoscopic medical system different from the configuration shown in FIG. 18.

FIG. 26 shows an overall configuration of a medical system different from the one shown in FIG. 18. The present embodiment has, in addition to the same components as those of the system 81 shown in FIG. 18, a component for communicating disconnection information to a manufacturer and/or a distributor. The same reference numerals will be assigned to components substantially identical to those of the system 81, and the description of the components will be omitted.

As shown in FIG. 26, the system controller 100 has a terminal adaptor 140 through which data is transmitted. The terminal adaptor 140 is linked to a computer 141 installed in a manufacturer and/or purchaser through digital communication 142. The computer 141 in the manufacturer and/or purchaser is connected to terminals 143a, 143b, 143c, etc. handled by specialized staff members.

If any cable included in the system is disconnected, disconnection information is displayed on the observation monitor 116a or 116b. In addition, the disconnection information is transmitted from the terminal adaptor 140 of the system controller 100 to the computer 141 in the manufacturer and/or purchaser through the digital communication 142. The disconnection information is then transmitted from the computer 141 to the terminals 143a, 143b, 143c, etc. handled by specialized staff members. Based on the transmitted information, the manufacturer and/or distributor check the disconnection without the necessity of waiting for a report from a user.

A data transmission tool is not limited to the terminal adaptor 140. A modem, a network board, or any other communication apparatus will do. The digital communication 142 may be replaced with a telephone line, cable television, satellite communication, or any other communication line.

The present embodiment provides the same advantages as the aforesaid embodiments. In addition, a user's complaint can be coped with immediately. Moreover, in case an abnormality occurs, a manufacturer and/or distributor can give appropriate instructions to a user over a communication line by means of a monitor or voice.

Figure 27:
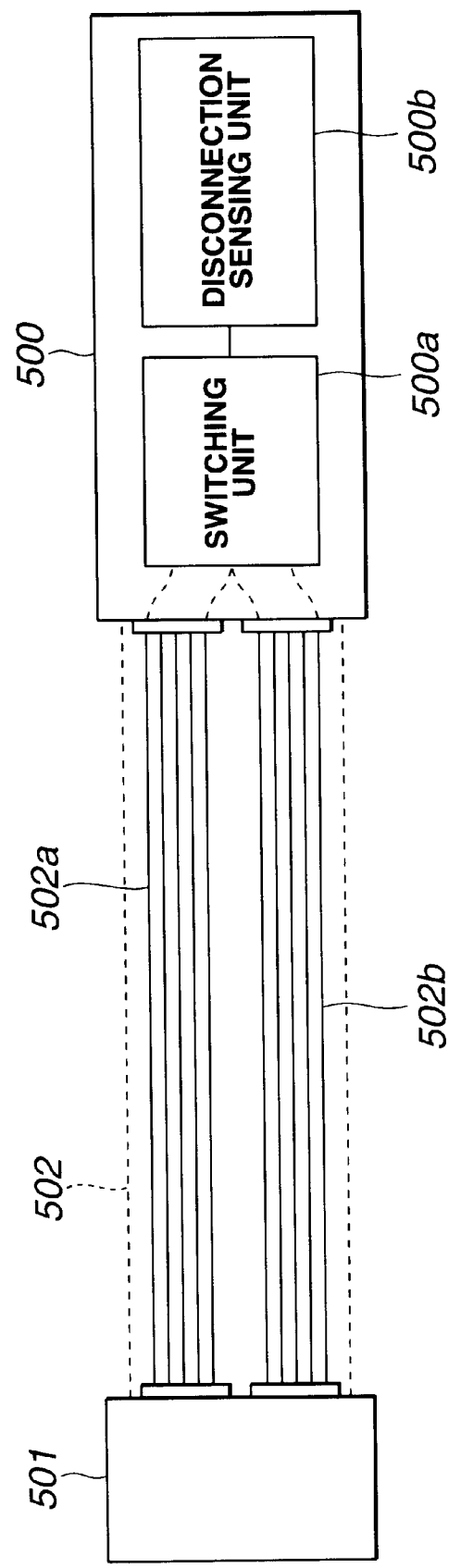
FIG. 27 is a conceptual explanatory diagram showing an endoscopic medical system capable of preventing failure of apparatuses constituting the system when a cable is disconnected.

FIG. 27 is a conceptual explanatory diagram of an endoscopic medical system capable of preventing a system failure in case of disconnection.

In an endoscopic medical system having a plurality of medical apparatuses interconnected over cables, if any cable is disconnected, the whole or part of the system fails.

A configuration capable of preventing a system failure in case of disconnection will be described by taking for instance a configuration having a medical apparatus A (for example, a light source unit) 500 and a medical apparatus B (for example, a camera control unit) 501 connected to each other over a cable 502.

In the medical apparatus A 500, a switching unit 500a for switching cables and a disconnection sensing unit 500b for sensing disconnection are incorporated together with an ordinary control circuit (not shown).

The cable 502 is composed of a pair of cables 502a and 502b. Data is transferred between the medical apparatus A 500 and medical apparatus B 501 over one of the cables 502a and 502b.

The cables 502a and 502b are connected to the medical apparatus A500, and either of the cables 502a and 502b is selected by the switching unit 500a and connected to the control circuit.

The disconnection sensing unit 500b in the medical apparatus A 500 senses disconnection of a selected cable according to a method of superposing a feeble current on a signal. If the disconnection of the selected cable is sensed, a signal instructing the switching unit 500a to select the other cable is output to the switching unit 500a.

For example, assume that data is transferred between the medical apparatus A 500 and medical apparatus B 501 with the cable 502a of the cable 502 selected. In this case, if the disconnection sensing unit 500b senses disconnection of the cable 502a, the switching unit 500a changes the cable 502a to the cable 502b. Consequently, data is transferred between the medical apparatus A 500 and medical apparatus B 501 over the cable 502b.

As mentioned above, even if one of cables is disconnected, the disconnected cable is automatically changed to the other cable. Consequently, a system failure stemming from disconnection can reliably prevented. If the cable 502 is realized with an optical fiber, the outer diameter of the cable can be reduced, and fast data communication can be achieved. Moreover, the cable 502 may be replaced with data communication. The present embodiment can be applied to infrared communication. The present embodiment would provide an effective countermeasure against disconnection of optical communication, or communication interruption derived from imperfect glow of an LED, malfunction of a receiving unit, or adhesion of dust. When only one of cables is disconnected, if the cable may be able to be replaced with an auxiliary one, the number of auxiliary cables can be decreased.

Next, a connected equipment identification system making it possible to recognize whatever equipment is connected to a terminal of whatever equipment over whatever cable, and check cable connections readily will be described on the assumption that a plurality of pieces of medical equipment is interconnected over cables. In other words, there is provided a connected apparatus identification system allowing an apparatus to recognize that the apparatus is connected to a terminal of whatever apparatus over whatever cable or cord, and to readily change a cable connection.

Figure 28:
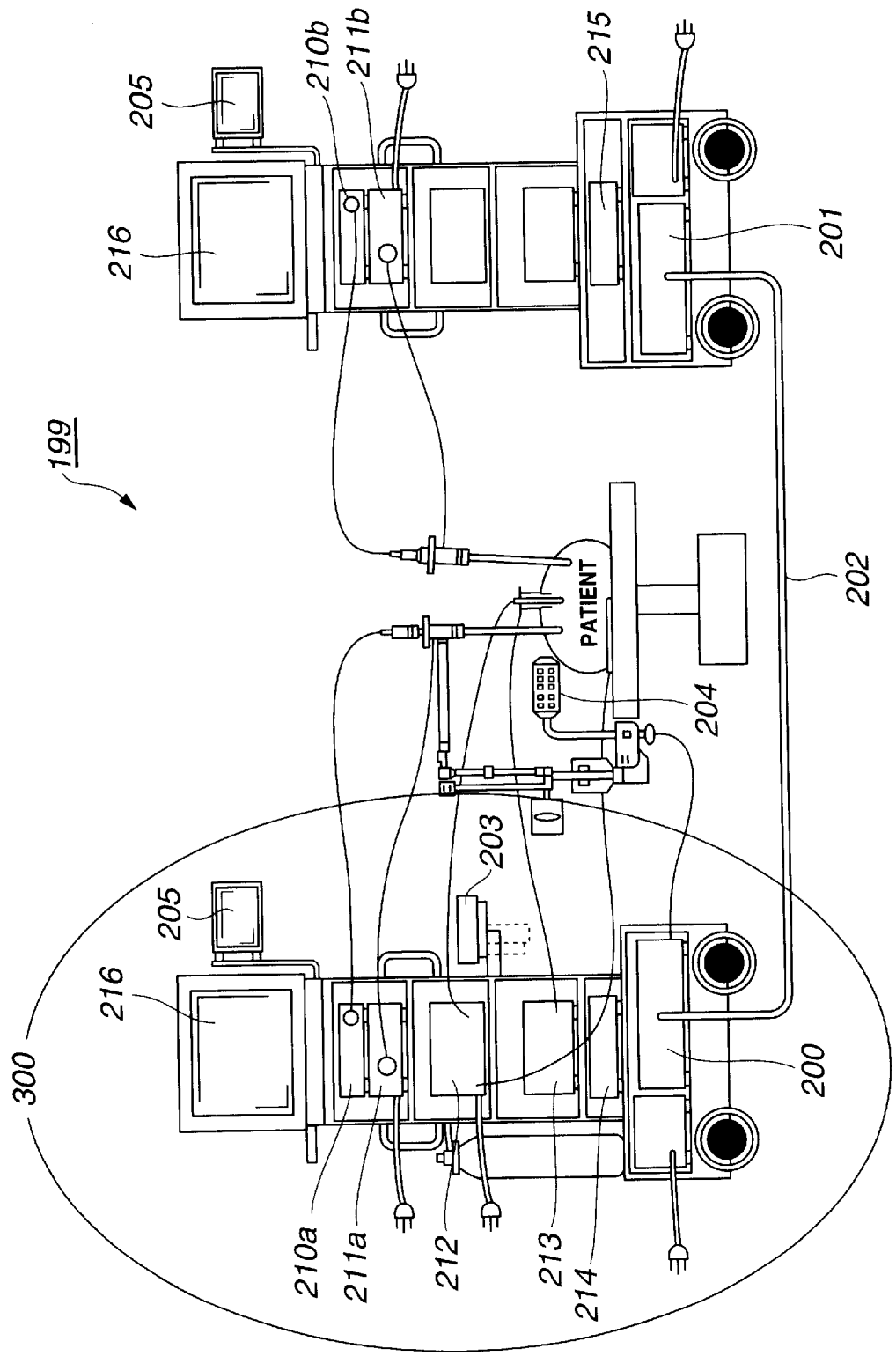
FIG. 28 shows a used state of a medical system included in a connected apparatus identification system.

As shown in FIG. 28, a medical system 199 realizing a connected apparatus identification system has an endoscope camera unit 210a, a light source unit 211a, an electric cautery 212, a pneumoperitoneum unit 213, and a VTR 214 connected to a system controller 200. The system controller 200 serves as a centralized control means for controlling the whole system and also serves as a connection recognizing means. The endoscope camera unit 210b, the light source unit 211b, and an image processing unit 215 are connected to a repeater unit 201. The apparatuses are controlled on a centralized basis by the system controller 200 also serving as a communicating means.

The repeater unit 201 relays communication between an endoscope camera unit 210b, a light source unit 211b, or an image processing unit 215 connected to the repeater unit 201, and the system controller 200 over a repeater cable 202.

The above apparatuses including the system controller 200 each realize the connection recognizing means.

The system controller 200 can be operated using a centralized operator panel 203 handled by a nurse or the like lying in an unsterilized area or a remote controller 204 handled by a surgeon lying in a sterilized area. Various data items can be selectively displayed on centralized display panels 205 attached to monitors.

The centralized operator panel 203 consists mainly of a display unit such as a liquid crystal display and a touch sensor formed as an integral part of the display unit. The centralized operator panel 203 has the ability to display the states of the apparatuses or display operation switches as a setting image, and the ability to input an instruction associated with each operation switch when an area in the touch sensor allocated to the operation switch is touched. An intended one of the states of the apparatuses connected to the system controller 200 and the operation switches is displayed on the screen of the centralized operator panel 203.

The control units connected to the system controller 200 transmit data to the system controller 200 over communication cables. When the system controller 200 is communicating with apparatuses, information concerning the apparatuses is displayed on the centralized operator panel 203, and the centralized operator panel 203 can be used to enter an instruction.

Images produced by the endoscope camera units 210a and 210b and others are displayed on the observation monitor 216 via the image processing unit 215.

Figure 29:
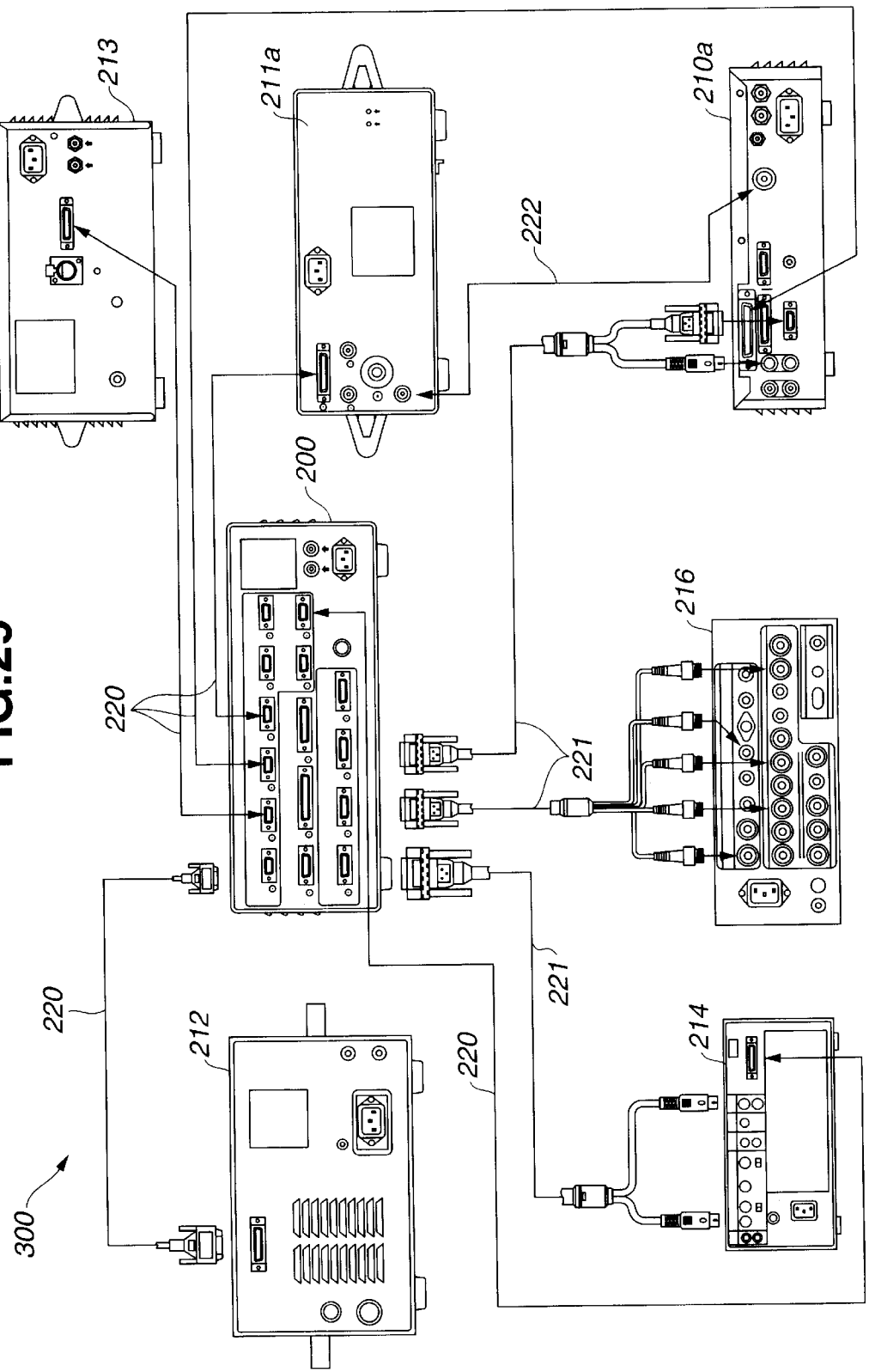
FIG. 29 shows connections of a system included in the medical system shown in the left-hand part of FIG. 28.

FIG. 29 shows cable connections of a system 300 of the medical system 199 shown in the left-hand part of FIG. 28. The system controller 200 is connected to the medical apparatuses, that is, the endoscope camera unit 210a, light source unit 211a, electric cautery 212, pneumoperitoneum unit 213, and VTR 214 over control cables 220. The system controller 200 is connected to the endoscope camera unit 210a, VTR 214, and monitor 216 over video cables 221.

Moreover, the endoscope camera unit 210a and light source unit 211a are connected directly over a light adjustment cable 222 without intervention by the system controller 200. Nine cables or cords except a power cord are used for the one of the systems.

Figure 30:
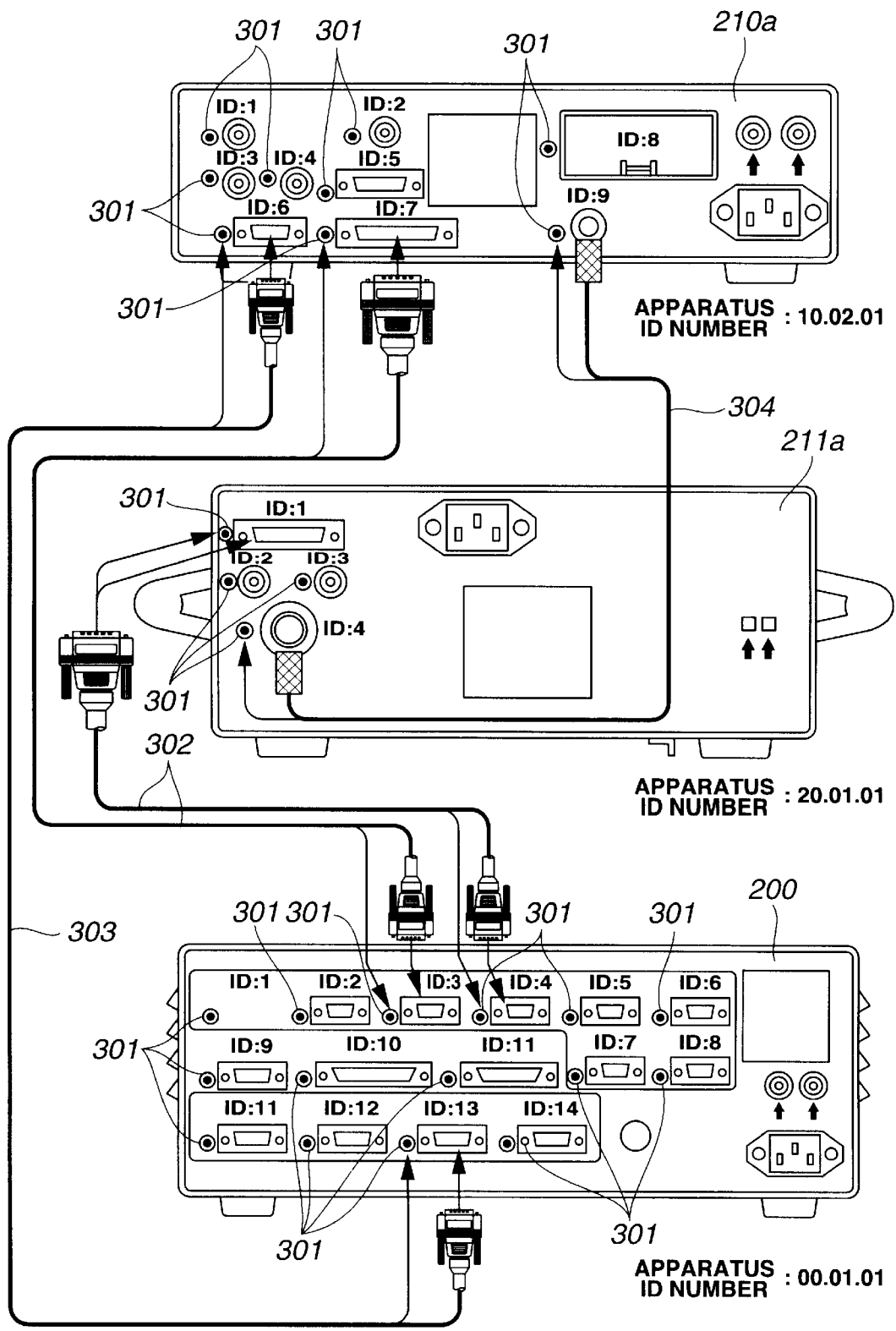
FIG. 30 shows connections among a system controller, an endoscope camera unit, and a light source unit included in the system shown in FIG. 29 and provided with communication terminals.

FIG. 30 shows cable connections among the system controller 200, endoscope camera unit 210a, and light source unit 211a included in the system shown in FIG. 29. Herein, a communication terminal 301 serving as a connection recognizing means is formed by the side of each of the terminals formed in the apparatuses for the purpose of identifying a connected medical apparatus.

The system controller 200 and the endoscope camera unit 210a or light source unit 211a are connected to each other through inherent control terminals and the communication terminals 301 used to recognize a connection over a control cable 302. The system controller 200 and endoscope camera unit 210a are connected to each other through inherent video terminals and the communication terminals 301 used to recognize a connection over a video cable 303. The endoscope camera unit 210a and light source unit 211a are connected to each other through inherent light adjustment terminals and the communication terminals 301 used to recognize a connection over a light adjustment cable 304.

The apparatuses have apparatus ID numbers assigned thereto so that they can be identified. The apparatus ID number consists of six characters (two high-order characters XX, two middle-order characters YY, and two low-order characters ZZ, that is, XX.YY.ZZ). The apparatus ID number of the endoscope camera unit 210a shall be 10.02.01, that of the light source unit 211a shall be 20.01.01, and that of the system controller shall be 00.01.01. A practical method of assigning an apparatus ID number and recognizing it will be described later.

Each apparatus has terminal ID numbers assigned to terminals thereof so that the terminals can be identified. Each terminal is identified with a unique electric resistance of a resistor mounted on a printed-circuit board and associated with the terminal.

In the state shown in FIG. 30, the terminal assigned a terminal ID number 6 and formed in the apparatus having an apparatus ID number 10.02.01 and the terminal assigned a terminal ID number 13 and formed in the apparatus having an apparatus ID number 00.01.01 are connected to each other. The terminal assigned a terminal ID number 7 and formed in the apparatus having an apparatus ID number 10.02.01 and the terminal assigned a terminal ID number 3 and formed in the apparatus having an apparatus ID number 00.01.01 are connected to each other. The terminal assigned a terminal ID number 9 and formed in the apparatus having an apparatus ID number 10.02.01 and the terminal assigned a terminal ID number 4 and formed in the apparatus having an apparatus ID number 20.01.01 are connected to each other. The terminal assigned a terminal ID number 1 and formed in the apparatus having an apparatus ID number 20.01.01 and the terminal assigned a terminal ID number 4 and formed in the apparatus having an apparatus ID number 00.01.01 are connected to each other. The connected apparatuses recognize their connection through the communication terminals 301. The recognized connections are displayed on the observation monitor 216. The recognized connections are displayed on the observation monitor 216 in the form of, for example, a cable connection diagram like the one shown in FIG. 29.

As mentioned above, apparatuses are connected to each other over a cable through inherent terminals and the communication terminals 301 used to recognize a connection with an apparatus ID number and a terminal ID number assigned to the apparatuses and terminals. An apparatus itself can recognize a connection to another apparatus, and identify the partner apparatus and the terminal thereof.

A simple resistor is used to identify a terminal. Alternatively, a rotary switch, a variable resistor, or any other variable hardware device will do. Otherwise, a procedure of identifying a terminal may be described in a program, and the terminal may thus be identified through a nearby communication terminal by software.

Figure 31:
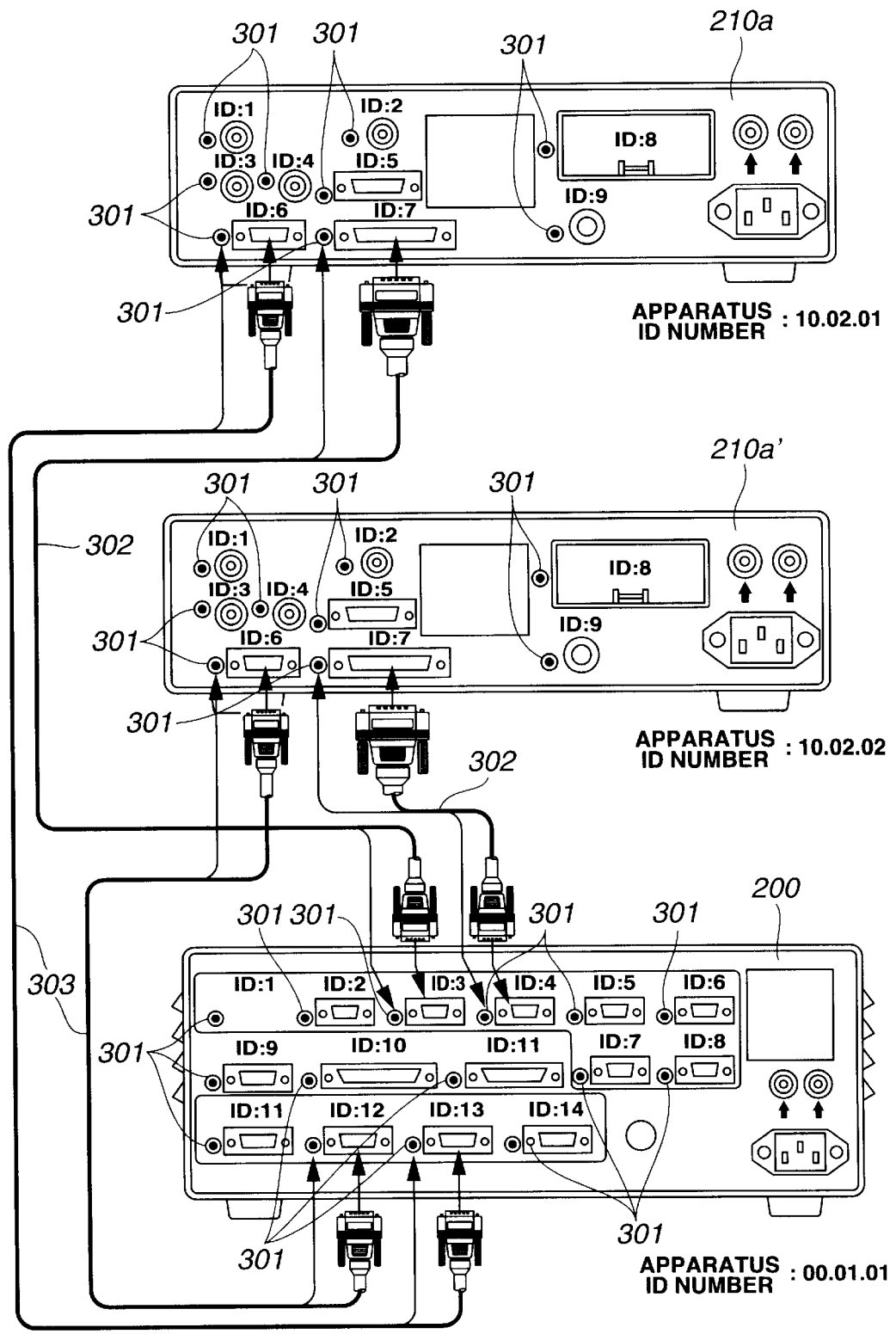
FIG. 31 shows connections made when two mutually-identical endoscope camera units are used with the light source unit shown in FIG. 30 replaced with the endoscope camera unit.

FIG. 31 shows cable connections to be made when two endoscope camera units 210a are connected by replacing the light source unit 211a shown in FIG. 30 with the endoscope camera unit 210a. The endoscope camera unit 210a and an endoscope camera unit 210a' are of the same model.

Similarly to FIG. 30, in FIG. 31, an apparatus ID number consists of six characters. An apparatus ID number assigned to the endoscope camera unit 210a shall be 10.02.01, that assigned to the endoscope camera unit 210a' shall be 10.02.02, and that assigned to the system controller 200 shall be 00.01.01. A practical method of assigning an apparatus ID number and a method of identifying an apparatus with an apparatus ID number will be described below.

In the state shown in FIG. 31, the terminal assigned a terminal ID number 6 and formed in the apparatus having an apparatus ID number 10.02.02 and the terminal assigned a terminal ID number 13 and formed in the apparatus having an apparatus ID number 00.01.01 are connected to each other. The terminal assigned a terminal ID number 7 and formed in the apparatus having an apparatus ID number 10.02.01 and the terminal assigned a terminal ID number 3 and formed in the apparatus having an apparatus ID number 00.01.01 are connected to each other. The terminal assigned a terminal ID number 6 and formed in the apparatus having an apparatus ID number 10.02.02 and the terminal assigned a terminal ID number 12 and formed in the apparatus having an apparatus ID number 00.01.01 are connected to each other. The terminal assigned a terminal ID number 7 and formed in the apparatus having an apparatus ID number 10.02.02 and the terminal assigned a terminal ID number 4 and formed in the apparatus having an apparatus ID number 00.01.01 are connected to each other. The connected apparatuses recognize their connection through the communication terminals 301. The recognized connections are displayed on the observation monitor 216. The recognized connections are displayed on the observation monitor 216 in the form of a cable connection diagram like, for example, the one shown in FIG. 29.

As mentioned above, apparatuses are connected to each other over a cable through inherent terminals and the communication terminals 301 used to recognize a connection with an apparatus ID number and a terminal ID number assigned to the apparatuses and terminals. Even if a plurality of apparatuses included in a system is of the same model, each apparatus can recognize a connection to another apparatus, and identify a partner apparatus and a terminal thereof.

FIG. 32 shows the names of apparatuses to which apparatus ID numbers are assigned as mentioned in conjunction with FIG. 30 and FIG. 31. The apparatus ID number consists of six characters.

The two high-order characters signify the classification of an apparatus. For example, 00 signify a system unit. 01 signify an endoscope camera unit. 02 signify a light source unit. 03 signify an image processing unit. 04 signify an electric cautery. 05 signify an ultrasonic treatment appliance. 06 signify a pneumoperitoneum unit. 07 signify an ultrasonic observation device. 08 signify a VTR. 09 signify a video printer. 10 signify a photography unit. 11 signify an image recording unit. 12 signify an observation monitor. 13 signify a centralized operator panel. 14 signify a remote controller.

The classifications of the apparatuses need not be modified once they are specified. A resistor is mounted on a printed-circuit board incorporated in each apparatus, and the resistance of the resistor is set to a unique value. Thus, the classification of each apparatus can be distinguished using the two high-order characters.

The two middle-order characters signify the model of a classified apparatus. For example, as for the classification of the system unit, 00 signify a system controller. 01 signify a repeater unit. As for the classification of the endoscope camera unit, 00 signify a one-CCD camera 1. 01 signify a three-CCD camera 1. 02 signify a one-CCD camera 2. 03 signify a three-CCD camera 2. 04 signify a one-CCD camera 3. 05 signify a three-CCD camera 3. As for the classification of the light source unit, 00 signify a xenon light source 1, 01 signify a halogen light source 1, 02 signify a xenon light source 2, and 03 signify a halogen light source 2.

As mentioned above, the apparatuses are sorted by model. For example, the one-CCD camera 1, one-CCD camera 2, and one-CCD camera 3 are ranked as a high-grade model, a middle-grade model, and a low-grade model respectively, or as an up-to-date model, a popular model, and an obsolete model respectively. The models of the apparatuses need not be modified once they are specified. Therefore, similarly to the classification signified with the two high-order characters, the model of an apparatus signified with the two middle-order characters is distinguished with a unique resistance of a resistor mounted on a printed-circuit board incorporated in each apparatus.

The two low-order characters signify option information. The option information is set to a default value 01 until the system recognizes that the power supply of an apparatus is turned on. The option information is used to discriminate between two apparatuses of the same model included in the system.

Assuming that a system includes two one-CCD cameras 1, option information concerning a one-CCD camera 1 whose connection is recognized first is set to 01. Option information concerning the other one-CCD camera 1 whose connection is recognized later is set to 02. The option information is preserved in a random access memory (hereinafter RAM) incorporated in each apparatus using software describing a procedure of identifying the apparatus until the power supply of the apparatus is turned off. This is because the option information varies depending on the sequence of turning on the power supplies of apparatuses.

A simple resistor is used to distinguish a classification signified by the two high-order characters of an apparatus ID number and a model signified by the two middle-order characters thereof respectively. A rotary switch, a variable resistor, or any other variable hardware device may be substituted for the simple resistor. Otherwise, a procedure of identifying an apparatus may be described in a software program. Moreover, the two low-order characters are preserved in a RAM. Alternatively, a hard disk drive, a silicon disk, a PC card, or any other storage medium will do.

The apparatus ID number consists of six characters. If necessary, the number of characters constituting the apparatus ID number may be increased or decreased.

The system 199 is characterized in that it includes an identifying means and a connection recognizing means. The identifying means identifies a plurality of apparatuses as well as a plurality of terminals formed in the apparatus and plugged with cables or cords over which the plurality of apparatuses is interconnected. When apparatuses are connected to each other through terminals thereof over a cable, the connection recognizing means recognizes a connection between the apparatuses according to an output of the identifying means, and reports the connection.

Operations to be exerted by the system 199 will be described below.

Figure 33:
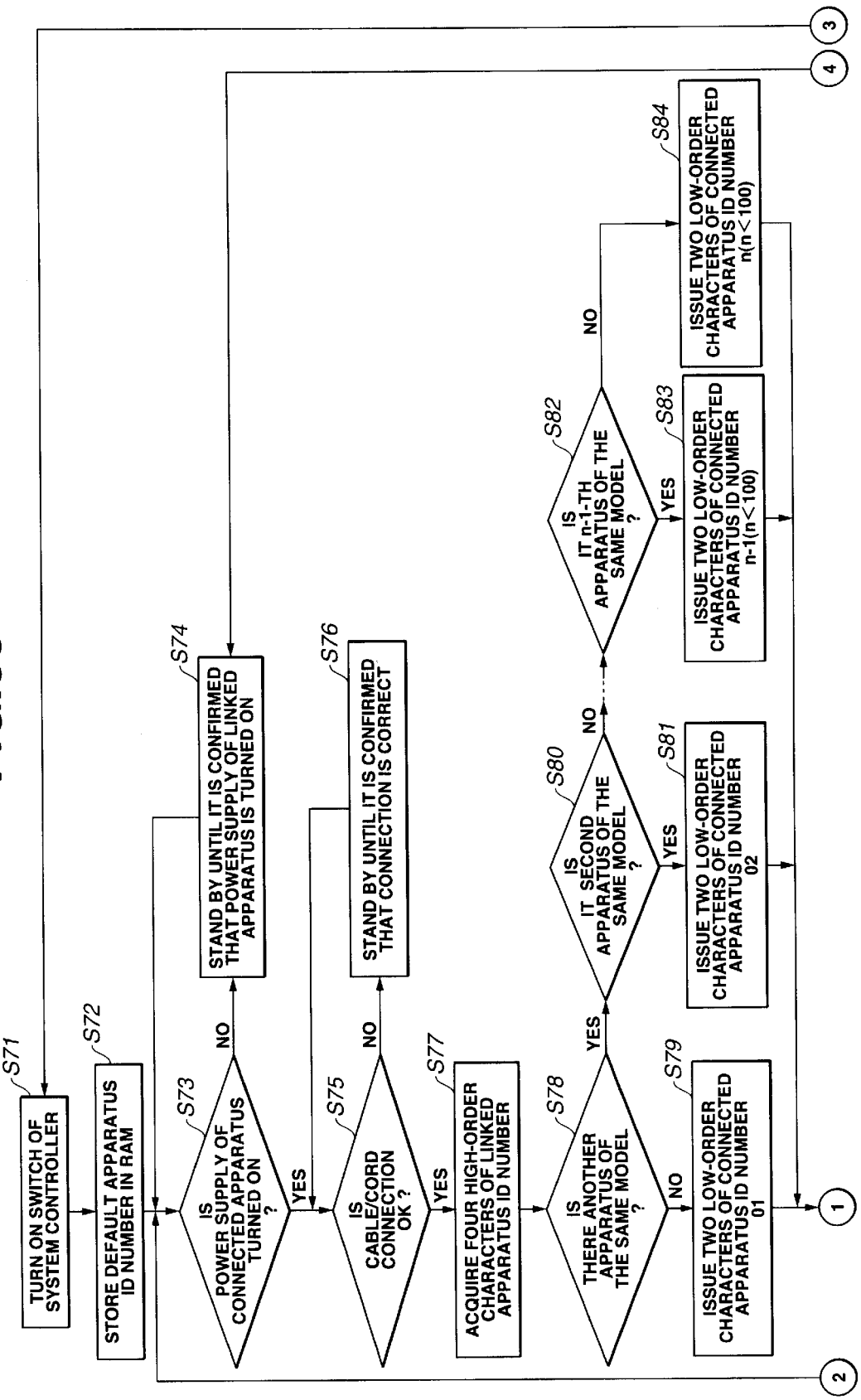
FIG. 33 is a first flowchart describing a procedure of recognizing a connection of the system controller shown in FIG. 28.
Figure 34:
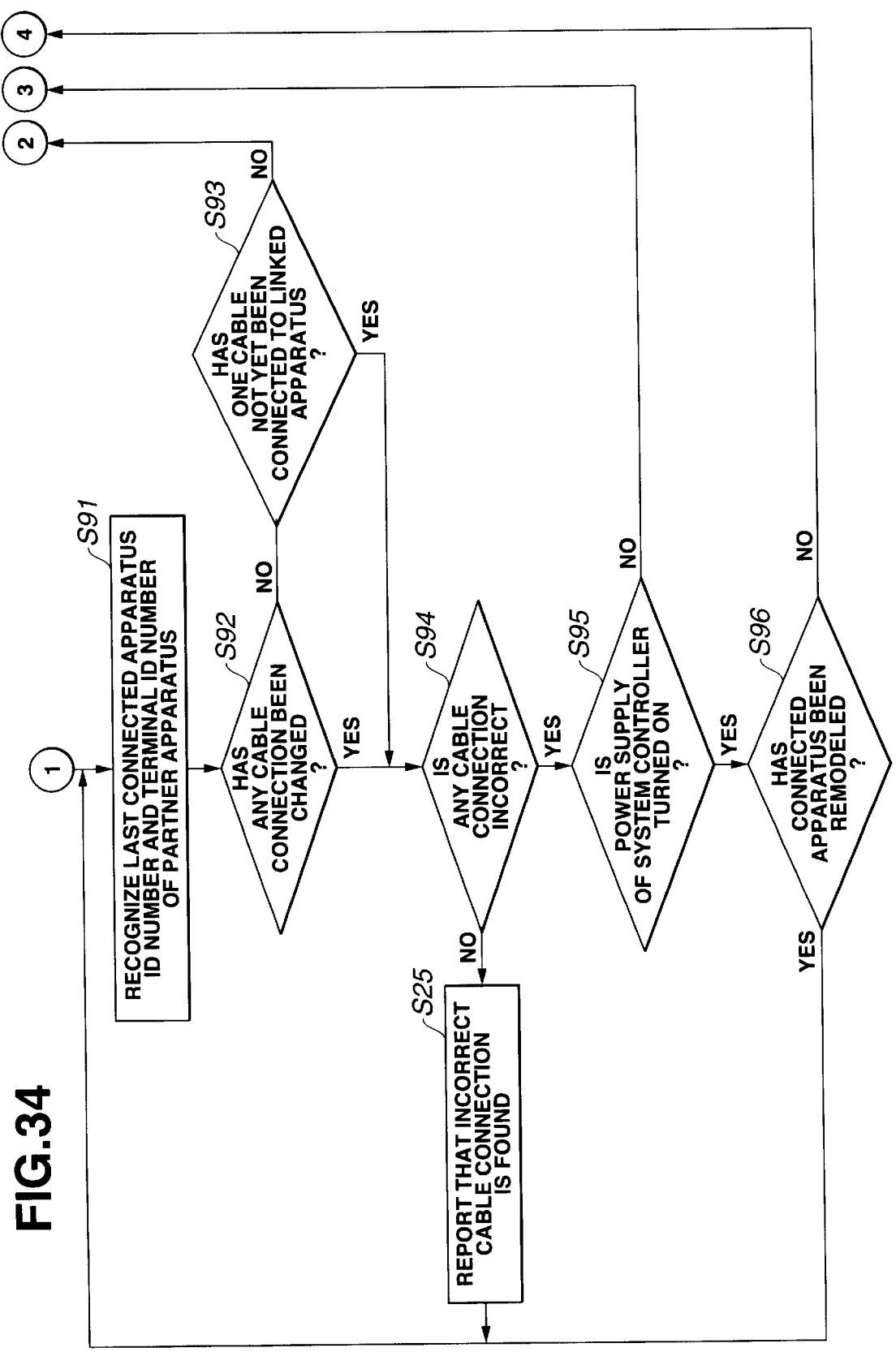
FIG. 34 is a second flowchart describing the procedure of recognizing a connection of the system controller shown in FIG. 28.
Figure 35:
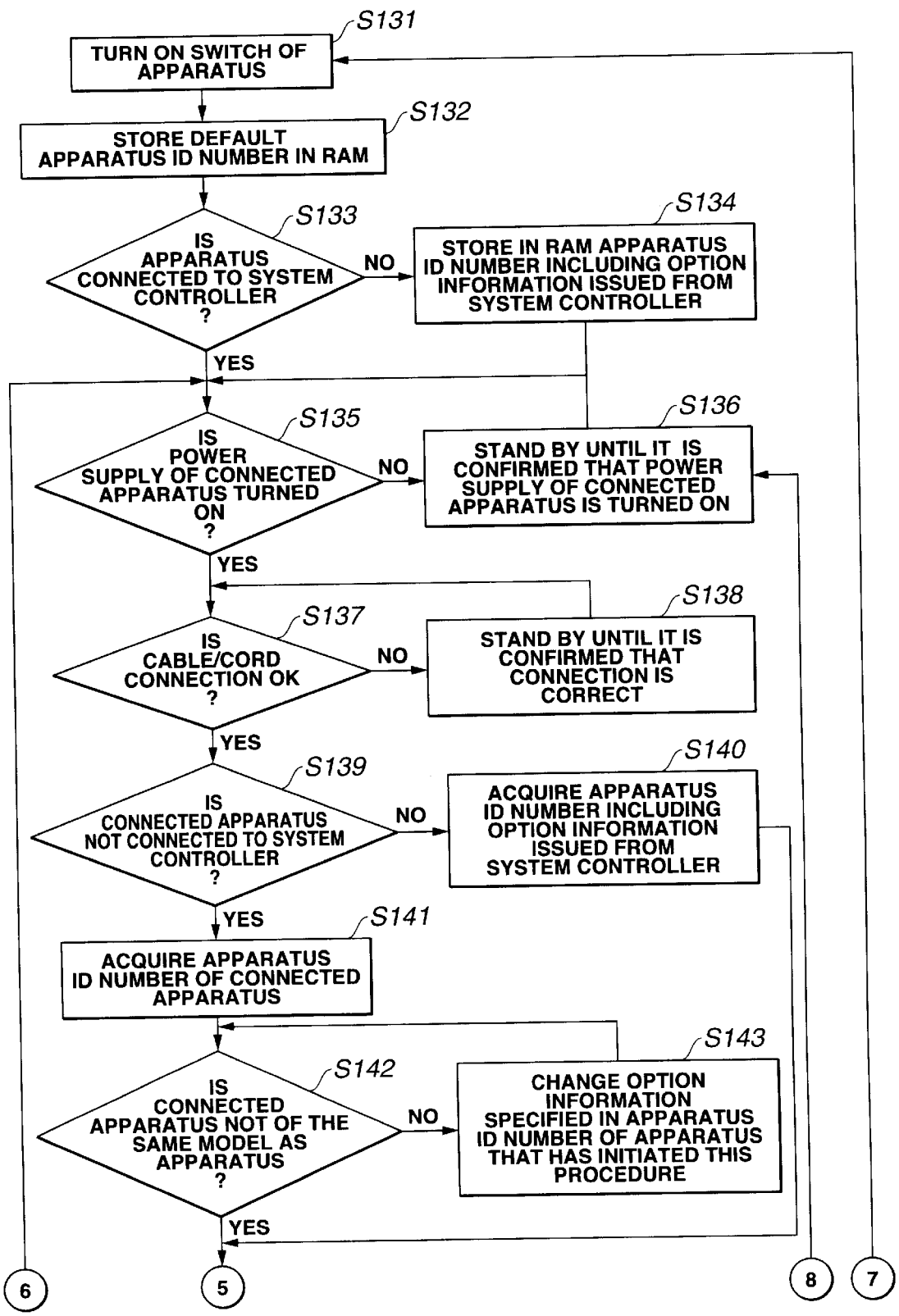
FIG. 35 is a first flowchart describing a procedure of recognizing a connection of an apparatus other than the system controller shown in FIG. 28.
Figure 36:
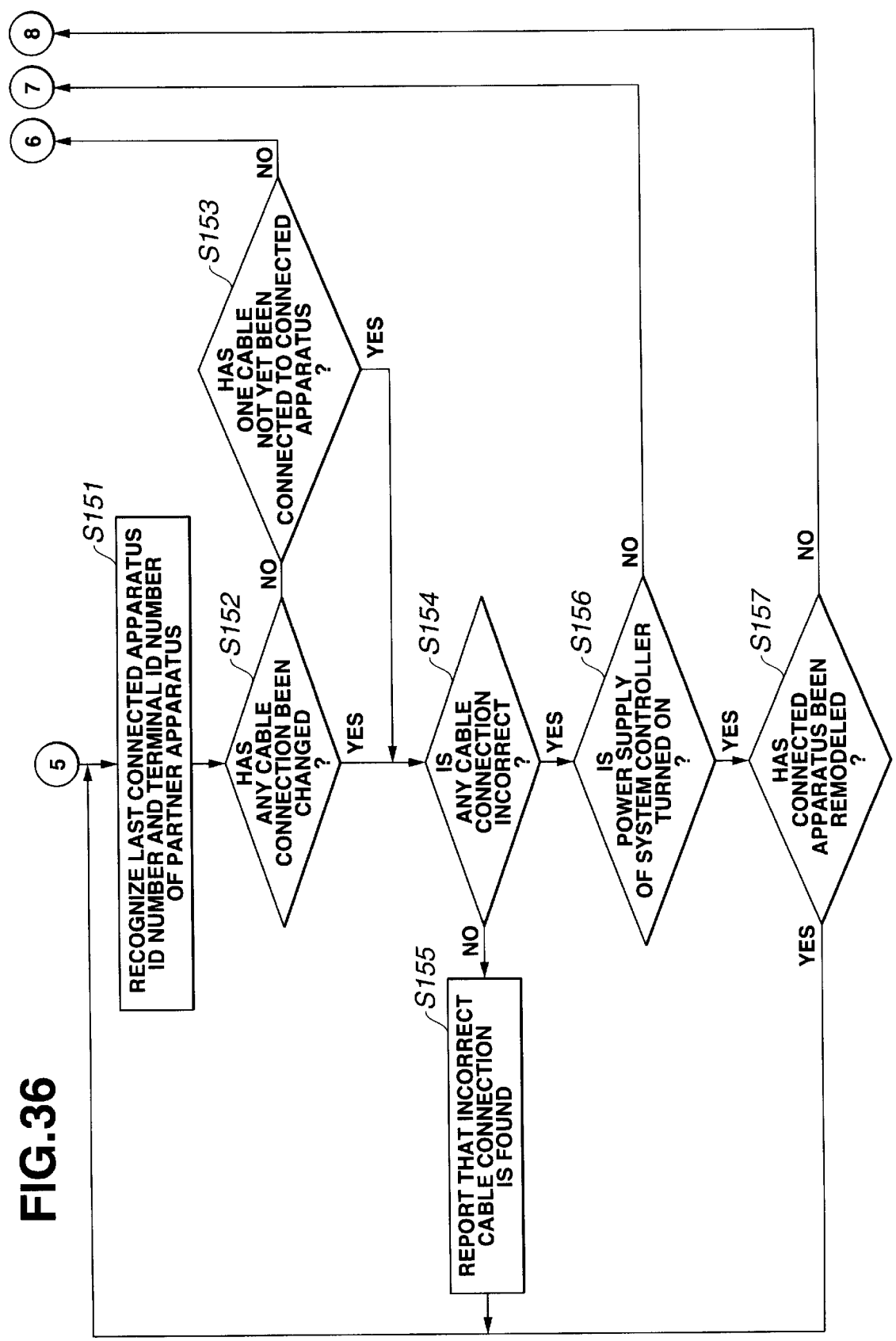
FIG. 36 is a second flowchart describing the procedure of recognizing a connection of apparatus other than the system controller shown in FIG. 28.

FIG. 33 and FIG. 34 are flowcharts describing a procedure of recognizing connections of the system controller 200. FIG. 35 and FIG. 36 are flowcharts describing a procedure of recognizing connections of an apparatus other than the system controller 200.

A method of assigning an apparatus ID number described in conjunction with FIG. 30 to FIG. 32 and a method of identifying an apparatus according to the apparatus ID number will be described with reference to FIG. 33 to FIG. 36.

To begin with, a procedure of recognizing connections of the system controller 200 will be described. As described in FIG. 33, at step S71, the power supply of the system controller 200 is turned on. At step S72, an apparatus ID number with which the system controller is identified is output. The apparatus ID number consists of six numerical characters. Immediately after the power supply is turned on, a default value is stored in the RAM. It is checked through the communication terminals 301 at step S73 and step S74 if the power supply of a connected apparatus is turned on. At step S75 and step S76, a connection to the connected apparatus over a cable or cord is checked.

If the connection to the connected apparatus is recognized, at step S77, the system controller 200 acquires the four high-order characters of the apparatus ID number that are already assigned to the connected apparatus. Based on the acquired four high-order characters, the system controller 200 checks if another apparatus of the same model is included in the system.

If it is recognized at step S78 that no more apparatus is of the same model, 01 is set as the two low-order characters (option information) of the apparatus ID number to be assigned to the connected apparatus. The apparatus ID number is then stored in the RAM in the connected apparatus. If a plurality of apparatuses included in the system are of the same model, it is checked at step S80 to step S84 if the number of apparatuses of the same model that have been connected to the system controller is n−1 (where n denotes a natural number smaller than 100). If a new connected apparatus is of the same model as a connected apparatus that has already been connected to the system controller, n is specified as option information of an apparatus ID number to be assigned to the new connected apparatus. The apparatus ID number is then stored in a RAM included in the new connected apparatus.

Apparatus ID numbers to be assigned to all apparatuses connected to the system controller 200 are determined as mentioned above.

Control is then passed to step S91 described in FIG. 34. All connections to the system controller 200 are recognized through the communication terminals 301 according to the determined apparatus ID numbers and the terminal ID numbers unique to the terminals. After the connections are recognized, at step S92 to step S97, the system controller 200 monitors the connections to see if any connection has been changed or is incorrect. It is also monitored if the power supply of the system controller 200 is turned off or if any of the connected apparatuses has been remodeled.

To be more specific, assume that it is found at step S92 that any connection is changed while the system is in operation, and that it is found at step S93 that all the connections to the connected apparatuses are discontinued. In this case, control is returned to the step S73 described in FIG. 33. Connections are recognized again. If it is found at step S94 that any connection is incorrect, the incorrect connection is indicated using the observation monitor 216 at step S95. At the same time, voice is uttered to report the fact. Control is then returned to step S91, and it is checked if the connection has been corrected.

If the connection has not been corrected, the reporting is continued. If it is found at step S96 that the power supply of the system controller 200 is turned off, all information is reset. Control is then returned to step S71 in FIG. 33, and the procedure is resumed to check a connection. If it is found at step S97 that the connected apparatus has been remodeled, control is returned to step S74 in FIG. 33. It is checked if a connection to the connected apparatus has been made.

Next, a procedure of recognizing a connection of an apparatus other than the system controller 200 will be described below. As described in FIG. 35, at step S131, the power supply of the apparatus is turned on. At step S132, a default value of an apparatus ID number with which the apparatus included in the system is identified is output. The apparatus ID number consists of six numerical characters. Immediately after the power supply of an apparatus is turned on, a default value of an apparatus ID number is stored in a RAM incorporated in the apparatus.

It is checked at step S133 and step S134 through the communication terminal 301 formed in the apparatus if the apparatus is connected to the system controller 200. If the apparatus is connected to the system controller 200, it acquires an apparatus ID number including option information determined by the system controller 200 and stores it in the RAM incorporated therein. At step S135 to step S136, it is checked if the power supply of a connected apparatus is turned on. At step S137 and step S138, it is checked if the apparatus and connected apparatus are connected to each other over a cable or cord.

If connections to connected apparatuses are recognized, it is check if each connected apparatus is connected to the system controller 200. If the connected apparatus is connected to the system controller, an apparatus ID number including option information determined by the system controller 200 is acquired. If the connected apparatus is not connected to the system controller 200, an apparatus ID number already assigned to the connected apparatus is acquired.

If it is found at step S142 that a connected apparatus is of the same model as the apparatus, option information specified in the apparatus ID number of the apparatus that has initiated this procedure is modified at step S143. Thus, the option information is set to a value different from that specified in the apparatus ID number of the connected apparatus.

According to the foregoing procedure, the apparatus ID numbers of the apparatus and connected apparatus are determined and stored in the RAMs incorporated in the apparatus and connected apparatus respectively.

Control is then passed to step S151 in FIG. 36. At step S151, all connections to the system controller 200 are recognized through the communication terminals 301 formed in the system controller according to the determined apparatus ID numbers and the terminal ID numbers unique to the terminals formed in the apparatuses. After the connections are recognized, at step S152 to step S157, the system controller 200 monitors the connections to see if any connection has been changed or is incorrect. It is also monitored if the power supply of the system controller 200 is turned off or if any of connected apparatuses has been remodeled.

To be more specific, assume that it is found at step S152 that any connection has been changed while the system is in operation, and that the connections of the apparatus to the connected apparatuses are all discontinued. In this case, control is returned to step S135 in FIG. 35. The connections are then checked again.

If it is found at step S154 that any connection is incorrect, the presence of an incorrect connection is indicated using the observation monitor 216 at step S155, and is also reported with voice. Control is then returned to step S151. It is checked if the connection has been corrected. If the connection has not been corrected, the reporting is continued.

If it is found at step S156 that the power supply of he system controller 200 is turned off, all information is reset. Control is returned to step S131 in FIG. 35, and connections are checked again. If it is found at step S157 that a connected apparatus has been remodeled, control is returned to step S140 in FIG. 35. The connection to the connected apparatus is checked again.

Figure 37:
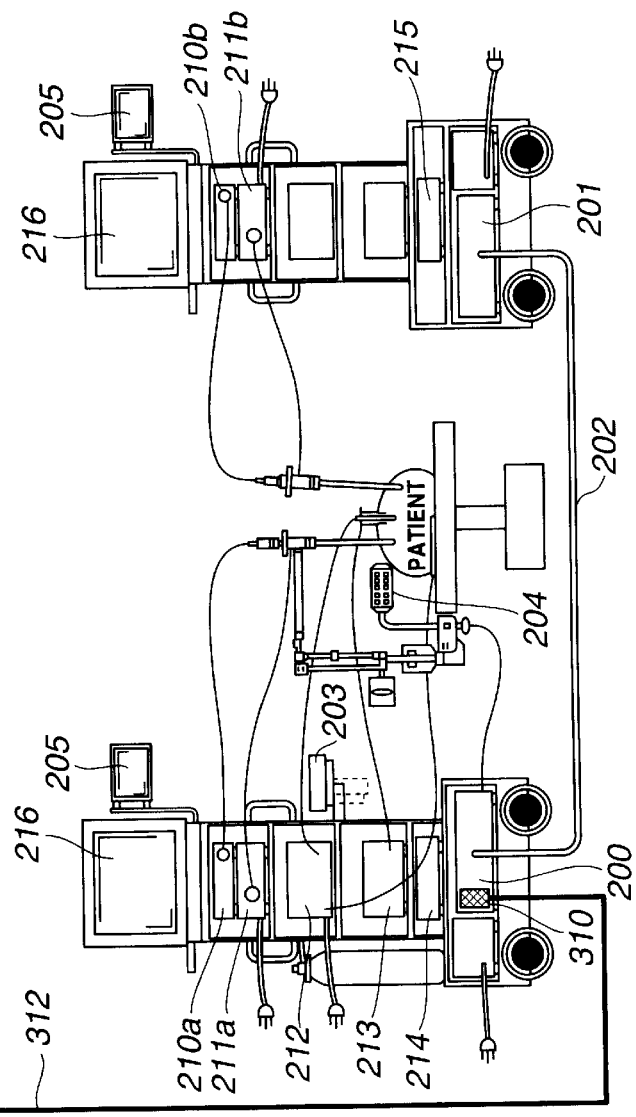
FIG. 37 is an explanatory diagram for explaining transmission from the medical system shown in FIG. 28 to an external system.

In the medical system of the present embodiment, as shown in FIG. 37, the terminal adaptor 310 for transmitting data is included in the system controller 200. The terminal adaptor 310 is linked to the computer 311 installed in a manufacturer and/or purchaser through digital communication 312. The computer 311 in the manufacturer and/or purchaser is connected to the terminals 313 to be handled by specialized staff members.

If a connection is made incorrectly within the system, the information of the incorrect connection is transmitted from the terminal adaptor 310 of the system controller 200 to the computer 311 in the manufacture and/or purchaser through the digital communication 312. The information of the incorrect connection is then distributed to the terminals 313 to be handed by specialized staff members. The staff member concerned need not visit the site at which the system is installed but gives a proper instruction using the observation monitor 216 as well as voice according to the received information by way of the digital communication 312, terminal adaptor 310, and system controller 200.

The system shown in FIG. 37 employs the terminal adaptor 310. Alternatively, a modem, a network board, or any other communication apparatus will do. The digital communication 312 may be replaced with a general telephone line, leased digital communication, cable television, satellite communication, or any other communication line.

The present embodiment is adapted to medical apparatuses. The present embodiment may also be adapted to any system composed of a plurality of apparatuses other than the medical apparatuses.

A RAM is used as a storage medium in which an apparatus ID number is stored. Alternatively, a hard disk drive, a silicon disk, a PC card, or any other storage medium will do.

As mentioned above, according to the present embodiment, a plurality of apparatuses included in a system are identified through the communication terminals 301 formed in the apparatuses. A plurality of terminals formed in the apparatuses and plugged with cables or cords can be identified. When apparatuses are connected to each other through the terminals formed therein over a cable, the system controller 200 recognizes the connection between the apparatuses through the communication terminals 301 formed in the apparatuses. The system controller 200 then reports the connection. Even when a plurality of apparatuses including apparatuses of the same model is connected to one another through analog communication over cables or cords, the connections among the apparatuses included in the system can be recognized readily.

Moreover, the information of connections may be transmitted to a manufacturer and/or purchaser via the terminal adaptor 310. In this case, the manufacturer and/or purchaser can readily check the connections among apparatuses constituting a system without the necessity of tracing cables one by one in consultation with a cable connection diagram or a manual.

Incidentally, embodiments realized by combining parts of the aforesaid embodiments shall belong to the scope of the present invention.

What is claimed is:

1. A medical apparatus supporting system comprising:
   a plurality of pieces of medical equipment having a communication facility;
   a reprogrammable storage device, included in each of said plurality of pieces of medical equipment, in which a program used to drive and control each piece of medical equipment is stored;
   a reprogramming control unit for reprogramming said storage device included in each piece of medical equipment; and
   a computer having a communication facility for communicating data over an information transmission line and transmitting a rewriting/updating program with which the program stored in said storage device is rewritten or updated,
   wherein the rewriting/updating program stored in said storage device included in at least one piece of medical equipment is transmitted to at least one piece of medical equipment over said information transmission line under control of said computer; and
   said reprogramming control unit rewrites or updates the program stored in at least one storage device using the received rewriting/updating program.

2. A medical apparatus supporting system according to claim 1, wherein said storage device is a nonvolatile reprogrammable storage device.

3. A medical apparatus supporting system according to claim 2, wherein said storage device is any of an EEPROM, a flash memory, and a hard disk.

4. A medical apparatus supporting system according to claim 1, wherein said information transmission line is a communication line for linking said pieces of medical equipment and said computer.

5. A medical apparatus supporting system according to claim 1, wherein said information transmission line comprises a repeater unit having a communication facility and being connected to said plurality of pieces of medical equipment over cables, and a communication line for linking said repeater unit and said computer.

6. A medical apparatus supporting system according to claim 5, wherein said reprogramming control unit is incorporated in said repeater unit.

7. A medical apparatus supporting system according to claim 1, wherein said reprogramming control unit is included in each piece of medical equipment.

8. A medical apparatus supporting system according to claim 1, wherein said reprogramming control unit judges whether program rewriting/updating has terminated normally.

9. A medical apparatus supporting system according to claim 8, wherein if program rewriting/updating has terminated abnormally, said reprogramming control unit retransmits a request for transmission of the rewriting/updating program to said computer.

10. A medical apparatus supporting system according to claim 1, wherein at least one of said plurality of pieces of medical equipment includes, in addition to said reprogrammable storage device, a second storage device in which a second program used to drive and control at least one piece of medical equipment is stored.

11. A medical apparatus supporting system according to claim 10, wherein said second storage device is a read-only memory.

12. A medical apparatus supporting system according to claim 10, wherein said second memory device is reprogrammable.

13. A medical apparatus supporting system according to claim 10, wherein said second program stored in said second storage device is a program describing a smaller number of facilities than said program stored in said storage device.

14. A medical apparatus supporting system according to claim 10, wherein: said reprogramming control unit judges whether program rewriting/updating has terminated normally if the program rewriting/updating has terminated abnormally, said reprogramming control unit alters the settings of medical equipment concerned so that the medical equipment will be activated with said second program.

15. A medical apparatus supporting system according to claim 1, wherein after said reprogramming control unit rewrites or updates the program stored in said storage device included in at least one piece of medical equipment, said reprogramming control unit returns the rewritten or updated program to said computer.

16. A medical apparatus supporting system according to claim 15, wherein said computer collates the returned program with said rewriting/updating program to see if the programs are mutually consistent.

17. A medical apparatus supporting system according to claim 16, wherein if the collation reveals that the programs are inconsistent with each other, said computer retransmits said writing/updating program.

18. A medical apparatus supporting system comprising:
   a plurality of pieces of medical equipment having a communication facility;
   a first reprogrammable storage device, included in each of said plurality of pieces of medical equipment, in which a program used to drive and control each piece of medical equipment is stored;
   a second reprogrammable storage device, included in each of said plurality of pieces of medical equipment, in which a program used to drive and control each piece of medical equipment is stored;
   a reprogramming control unit for reprogramming said first and second storage devices; and
   a computer having a communication facility for communicating data over an information transmission line, and transmitting a rewriting/updating program with which the program stored in said first or second storage device is rewritten or updated,
   wherein: said rewriting/updating program with which the program stored in the storage device included in at least one piece of medical equipment is rewritten or updated is transmitted to said at least one piece of medical equipment over said information transmission line under control of said computer; and
   said reprogramming control unit rewrites or updates the program stored in said first or second storage device using said received rewriting/updating program.

19. A medical apparatus supporting system according to claim 18, wherein said storage device is any of an EEPROM, a flash memory, and a hard disk.

20. A medical apparatus supporting system according to claim 18, wherein said reprogramming control unit rewrites or updates the program stored in one of said first and second storage devices.

21. A medical apparatus supporting system according to claim 18, wherein said reprogramming control unit rewrites or updates the programs stored in said first and second storage devices according to the number of times of reception of said rewriting/updating program.

22. A medical apparatus supporting system according to claim 18, wherein said reprogramming control unit rewrites or updates one of the programs stored in said first and second storage devices.

23. A medical apparatus supporting system according to claim 18, wherein after said reprogramming control unit rewrites or updates either of the programs stored in said first and second storage devices, said reprogramming control unit copies the rewritten or updated program to the other storage device.

24. A medical apparatus supporting system according to claim 18, wherein after said reprogramming control unit rewrites or updates either of the programs stored in said first and second storage devices, said reprogramming control unit judges whether the rewriting/updating has terminated normally.

25. A medical apparatus supporting system according to claim 24, wherein if said reprogramming control unit judges that the rewriting/updating has terminated abnormally, the settings of medical equipment concerned are altered so that the medical equipment will be activated with the program that is stored in the other storage device and has not been rewritten or updated.

26. A medical apparatus supporting system according to claim 18, wherein before a program is rewritten or updated using said rewriting/updating program, medical equipment having a program thereof supposed to be rewritten or updated is locally assessed.

27. A medical apparatus supporting system according to claim 26, wherein if the results of local assessment reveal that the medical equipment acts normally, the program stored in said first or second storage device is rewritten or updated.

28. A medical apparatus supporting system according to claim 27, wherein: after rewriting/updating is completed, local assessment is performed again; if the results of local assessment reveal that the medical equipment acts normally, the settings of the medical equipment are altered so that the medical equipment will be activated with the rewritten or updated program.

29. A medical apparatus supporting system comprising:
   a plurality of pieces of medical equipment having a communication facility;
   a first storage device, included in each of said plurality of pieces of medical equipment, in which a first program used to drive and control each piece of medical equipment is stored;
   a second storage device in which a second program used to drive and control each of said plurality of pieces of medical equipment is stored;
   a reprogramming control unit for reprogramming said first storage device; and
   a computer having a communication facility for communicating data over an information transmission line, and transmitting a rewriting/updating program with which the first program stored in said first storage device is rewritten or updated,
   wherein: said rewriting/updating program with which the first program stored in said first storage device included in at least one piece of medical equipment is rewritten or updated is transmitted to said at least one piece of medical equipment over said information transmission line; and
   said reprogramming control unit rewrites or updates the first program stored in said first storage device using said received rewriting/updating program.

30. A medical apparatus supporting system according to claim 29, wherein said second storage device is a read-only storage device that is not reprogrammable.

31. A medical apparatus supporting system according to claim 29, wherein said second storage device is a reprogrammable storage device, and said reprogramming control unit rewrites or updates the second program stored in said second storage device using said rewriting/updating program.

32. A medical apparatus supporting system according to claim 29, wherein if said reprogramming control unit fails to normally rewrite or update the first program using said rewriting/updating program, said reprogramming control unit alters the settings of medical equipment concerned so that the medical equipment will be activated with the second program.

33. A medical apparatus supporting system according to claim 29, wherein when said reprogramming control unit has rewritten or updated the first program using said rewriting/updating program, said reprogramming control unit returns the rewritten or updated program to said computer, and said computer collates the received program with the transmitted program.

34. A medical apparatus supporting system comprising:
medical equipment having a communication facility;
an electrically reprogrammable storage device in which a program used to drive and control said medical equipment is stored;
a remote unit having a communication facility for transmitting a rewriting/updating program to said medical equipment over at least a communication line; and
a reprogramming control unit for receiving said rewriting/updating program from said remote unit, and reprogramming said storage device.

35. A medical apparatus supporting system according to claim 34, further comprising, in addition to said medical equipment, second medical equipment having a communication facility, wherein said second medical equipment includes a second electrically reprogrammable storage device in which a second program used to drive and control said second medical equipment is stored, and a second reprogramming control unit for receiving a second rewriting/updating program from said remote unit over at least a communication line, and rewriting or updating the second program.

36. A medical apparatus supporting system according to claim 35, wherein said medical equipment and second medical equipment are connected to a control unit, which has a communication facility and controls said medical equipment and second medical equipment, over cables, and said control unit is linked to said remote unit over A common communication line.

37. A medical apparatus supporting system according to claim 35, where in an auxiliary operation program is stored in said storage device and second storage device in addition to said program or second program.

38. A medical apparatus supporting system according to claim 37, wherein if said program or second program is rewritten or updated abnormally using said rewriting/updating program or second rewriting/updating program, said auxiliary operation program is invoked.

39. A medical apparatus supporting system comprising:
a plurality of pieces of medical equipment;
printed-circuit boards included in each of said plurality of pieces of medical equipment and used to drive and control apparatuses constituting each piece of medical equipment;
a display device for displaying the state of each piece of medical equipment that acts while being driven and controlled using said printed-circuit boards; and
a local assessment unit for judging whether the state of each piece of medical equipment driven and controlled using said printed-circuit boards is normal, and producing error information when the driven and controlled state is judged to be abnormal,
wherein when said local assessment unit assesses that the state of each piece of medical equipment driven and controlled using said printed-circuit boards is abnormal, the error information is displayed on said display device.

40. A medical apparatus supporting system comprising:
a medical equipment driving information acquisition unit installed in a maintenance service provider for providing a maintenance service for a plurality of pieces of medical equipment;
printed-circuit boards included in each of said plurality of pieces of medical equipment and used to drive and control apparatuses constituting each piece of medical equipment;
a local assessment unit for judging whether the state of each piece medical equipment driven and controlled using said printed-circuit boards is normal, and producing error information when the driven and controlled state is judged to be abnormal; and
a communication unit for linking said pieces of medical equipment and said medical equipment driving information acquisition unit,
wherein when the results of judgment made by said local assessment unit reveal that the state of medical equipment driven and controlled using said printed-circuit boards is abnormal, if the error information is produced, said communication unit transmits the error information to said medical equipment driving information acquisition unit.

* * * * *